United States Patent
Lee et al.

(10) Patent No.: US 11,449,445 B2
(45) Date of Patent: Sep. 20, 2022

(54) TRANSACTION-BASED HYBRID MEMORY

(71) Applicant: Futurewei Technologies, Inc., Plano, TX (US)

(72) Inventors: Xiaobing Lee, Santa Clara, CA (US); Feng Yang, Portland, OR (US)

(73) Assignee: Futurewei Technologies, Inc., Addison, TX (US)

( * ) Notice: Subject to any disclaimer, the term of this patent is extended or adjusted under 35 U.S.C. 154(b) by 235 days.

(21) Appl. No.: 16/802,152

(22) Filed: Feb. 26, 2020

(65) Prior Publication Data

US 2020/0192841 A1    Jun. 18, 2020

Related U.S. Application Data

(62) Division of application No. 15/252,594, filed on Aug. 31, 2016, now Pat. No. 10,579,560.

(51) Int. Cl.
*G06F 3/06* (2006.01)
*G06F 13/28* (2006.01)

(52) U.S. Cl.
CPC ............ *G06F 13/28* (2013.01); *G06F 3/0631* (2013.01); *G06F 3/0685* (2013.01); *G06F 3/061* (2013.01); *G06F 3/0683* (2013.01); *G06F 3/0688* (2013.01)

(58) Field of Classification Search
CPC ...... G06F 3/0685; G06F 3/0631; G06F 3/061; G06F 3/0688; G06F 3/0683; G06F 13/28
See application file for complete search history.

(56) References Cited

U.S. PATENT DOCUMENTS

| | | | | |
|---|---|---|---|---|
| 6,421,760 | B1* | 7/2002 | McDonald | G06F 3/061 |
| | | | | 711/105 |
| 2014/0304475 | A1* | 10/2014 | Ramanujan | G06F 1/30 |
| | | | | 711/128 |
| 2015/0100860 | A1 | 4/2015 | Lee et al. | |
| 2015/0363338 | A1* | 12/2015 | Cho | G06F 3/061 |
| | | | | 711/154 |
| 2018/0059966 | A1 | 3/2018 | Lee et al. | |

OTHER PUBLICATIONS

"U.S. Appl. No. 15/252,594, Non Final Office Action dated Mar. 28, 2019", 10 pgs.
"U.S. Appl. No. 15/252,594, Notice of Allowance dated Oct. 23, 2019", 17 pgs.
"U.S. Appl. No. 15/252,594, Response filed Dec. 3, 2018 to Restriction Requirement dated Oct. 2, 2018", 5 pgs.
"U.S. Appl. No. 15/252,594, Response Filed Aug. 27, 2019 to Non Final Office Action dated Mar. 28, 2019", 10 pgs.
"U.S. Appl. No. 15/252,594, Restriction Requirement dated Oct. 2, 2018", 5 pgs.

* cited by examiner

*Primary Examiner* — Ernest Unelus
(74) *Attorney, Agent, or Firm* — Schwegman Lundberg & Woessner, P.A.

(57) ABSTRACT

A transaction-based hybrid memory device includes a host memory controller to control operation of the device. A hybrid memory controller is coupled to the host memory controller over a memory bus. The hybrid memory controller includes non-volatile memory control logic to control operation of non-volatile memory devices and cache control logic to accelerate cache operations, a direct memory access (DMA) engine to control volatile cache memory and to transfer data between non-volatile memory, and cache memory to off load host cache managements and transactions. A host interface couples the host memory controller to the memory bus.

18 Claims, 23 Drawing Sheets

DDR4 Command Truth Table

301 ~ WR [17:0] = NVM_regW [13:0] + CRC[2:0]   write to 16K of 64bit registers
302 ~ RD [17:0] = NVM_regR [13:0] + CRC[2:0]   read from 16K of 64bit registers
303 ~ ACT_0 ACT_1 [41:0] = NVM_cmd [37:0] + CRC[3:0]   A17 = 0/1 to indicate the ACT_0 or ACT_1
304 ~ NVM_cmd [37:0] = CMD[2:0], mode[1:0], Bank[3:0], Address[28:0] for 1 TB by 128B aligned burst accesses, or 32TB by 4KB block accesses

| Function | Abbr-evia-tion | CKE Previ-ous Cycle | CKE Curr-ent Cycle | CS_n | ACT_n | RAS_n/ A16 | CAS_n/ A15 | WE_n/ A14 | BG0-BG1 | BA0-BA1 | C2-C0 | A12/ BC_n | A17, A13, A11 | A10/ AP | A0-A9 | NOTE |
|---|---|---|---|---|---|---|---|---|---|---|---|---|---|---|---|---|
| Mode Register Set | MRS | H | H | L | H | L | L | L | BG | BA | V | | | | | 12 |
| Refresh | REF | H | H | L | H | L | L | H | V | V | V | V | V | V | V | |
| Self Refresh Entry | SRE | H | L | L | H | L | L | H | V | V | V | V | V | V | V | 7,9 |
| Self Refresh Exit | SRX | L | H | H | X | X | X | X | X | X | X | X | X | X | X | 7,8, 9,10 |
| Single Bank Precharge | PRE | H | H | L | H | L | H | L | V | V | V | V | V | L | V | |
| Precharge all Banks | PREA | H | H | L | H | L | H | L | V | V | V | V | V | H | V | |
| RFU | RFU | H | H | L | H | H | H | H | | | RFU | | | | | |
| Bank Activate | ACT | H | H | L | L | Row Address(RA) | | | BG | BA | V | Row Address (RA) | | | | A[20:0] |
| Write (Fixed BL8 or BC4) | WR | H | H | L | H | L | L | H | BG | BA | V | V | V | L | CA | |

TRANSACTION-BASED HYBRID MEMORY

RELATED APPLICATION

This application is a division of and claims the benefit of priority to U.S. application Ser. No. 15/252,594, filed Aug. 31, 2016, which application is incorporated by reference as if reproduced herein and made a part hereof in its entirety, and the benefit of priority of which is claimed herein.

TECHNICAL FIELD

The present disclosure is related generally to memory and in particular to transaction-based dynamic random access memory devices having non-volatile memory.

BACKGROUND

A large number of different types of memories are available for use in computer systems. For example, volatile memory includes random access memories (RAM) that are typically a fast-access memory used for frequent memory reads and writes in a computer system. Common types of RAM include Dynamic RAM (DRAM) and Static RAM (SRAM). RAM is used for all forms of computing today, from small electronic devices to large data centers that need relatively short latency as synchronized read/write accesses. However, volatile memory, as the name implies, loses stored data after power is removed.

Non-volatile memory, which may be used to provide large memory capacity, includes flash memory and phase change memory (PCM). Non-volatile memory retains stored data even after power has been removed. However, non-volatile memories (NVM) typically have much longer and nondeterministic read/write latencies caused by higher bit error rates than RAM. Emerging new persistent memories (PM) could greatly improve the read/write access latencies such as 3D-XPoint memory and fast flash memories with lower cost than DRAM as measured by a dollars per gigabyte cost ratio.

Each memory type has its advantages and disadvantages in terms of latency/performance, capacity, energy usage, etc. As such, one typically sacrifices the advantages of one type of memory when using another type of memory.

SUMMARY

A transaction-based hybrid memory system includes a host memory controller in a central processing unit (CPU) to control operations of dedicated DRAM devices and DRAM devices mixed with PM, NVM, or NAND devices. A hybrid memory controller is coupled to the host memory controller over a memory bus. The hybrid memory controller includes non-volatile memory control logic to control access of non-volatile memory devices and cache control logic. The hybrid memory controller has a direct memory access (DMA) engine to control volatile memory as cache memory and to transfer data between non-volatile memory and cache memory. A host interface couples the host memory controller to the memory bus. The DRAM cached PM, NVM, or NAND in hybrid devices may provide DRAM performances in most of cache-hit times with nondeterministic latencies at few cache-miss moments by low cost non-volatile memories.

BRIEF DESCRIPTION OF THE DRAWINGS

FIG. 3 illustrates a transaction command table, in accordance with various embodiments.

DETAILED DESCRIPTION

Some of the challenges noted above, as well as others, may be addressed by the transaction-based hybrid memory devices of the disclosed embodiments incorporating both volatile memory (e.g., DRAM) and non-volatile memory that are coupled by a hybrid memory controller that is separate from the host central processing unit (CPU) (i.e., host memory controller). The host memory controller can write commands to the hybrid memory controller and the hybrid memory controller determines whether to access the volatile memory or the non-volatile memory. A single transaction command from the host memory controller causes these data transfers to occur in the background (e.g., the host memory controller does not participate). Thus, the time necessary for the host controller to perform memory operations may be greatly reduced using the disclosed embodiments.

Figure 1:
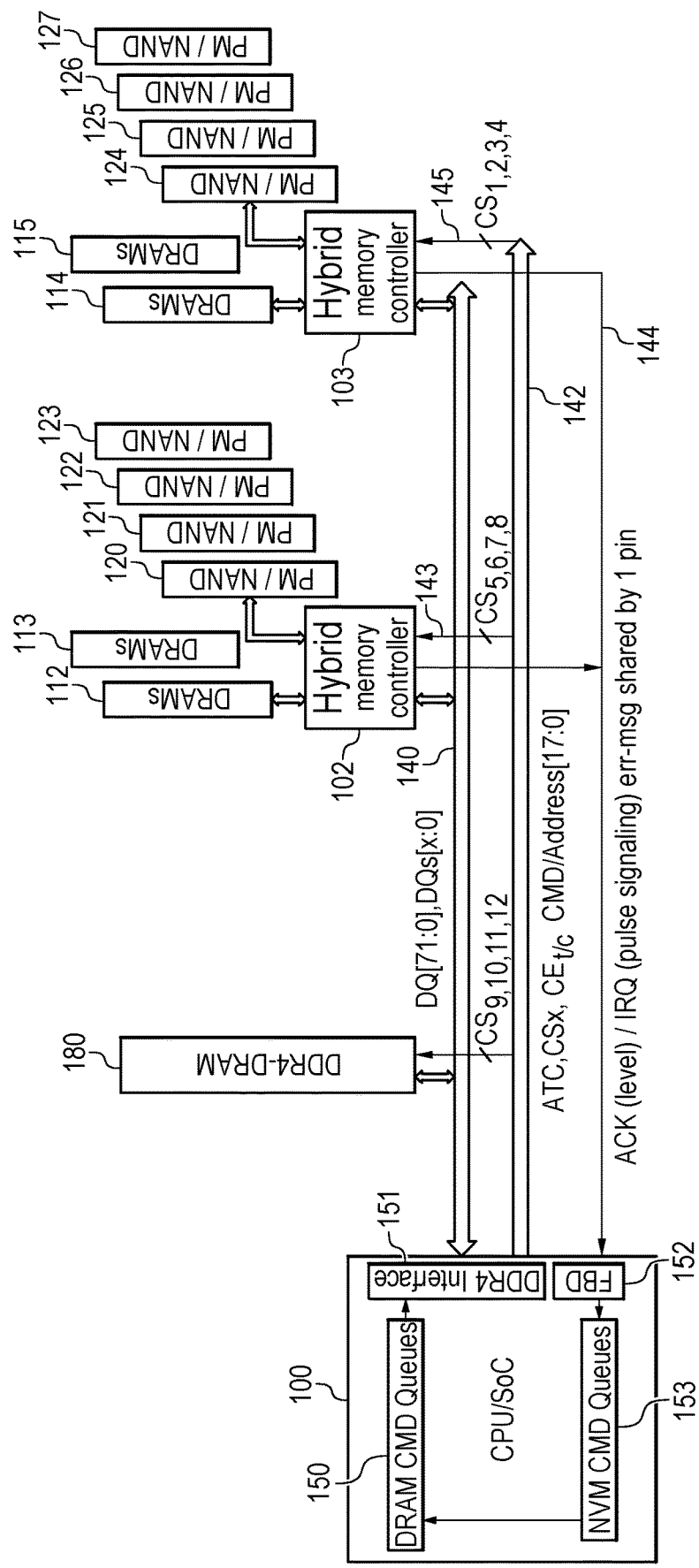
FIG. 1 illustrates a block diagram of a transaction-based hybrid memory system, in accordance with various embodiments.

FIG. 1 illustrates a block diagram of a transaction-based hybrid memory system, in accordance with various embodiments. The quantities of volatile and persistent and non-volatile memories shown in FIG. 1 are for purposes of illustration only as other embodiments may use different quantities of memories. Similarly, subsequent references to the use of DRAM as an example of the volatile memory are for purposes of illustration only.

The transaction-based hybrid memory system comprises a host memory controller 100 that is responsible for control of the memory device. The host memory controller 100 generates the read and write command as well as the addresses to be read from and written to.

The host memory controller 100 includes a memory bus interface 151 that interfaces the host memory controller 100 to a memory bus 140 that aggregates the memory devices. If the memory bus 140 is a dual data rate fourth generation (DDR4) protocol bus, then the memory bus interface 151 would be a DDR4 interface. The memory bus interface 151 is responsible for converting data, commands, or addresses to be transmitted on the memory data bus 140 and control bus 142 into appropriate bus signals that interconnect a DRAM device 180 and two Hybrid memory controllers 102 and 103. The DRAM command queues 150 and NVM command queues 153 interleave conventional synchronized traffic and nondeterministic transactional traffic.

Volatile memory command queues 150 provide controls to the memory bus interface 151. The volatile memory command queues 150 are responsible for scheduling the volatile memory commands to be transmitted through the memory bus interface 151 and over the memory bus 140 at proper timings to effectively use the DRAM-DIMM device 180 and the DRAMs 112, 113, 114, 115 as synchronized data traffic.

Non-volatile memory command queues 153 are interleaving the nondeterministic non-volatile traffic into the volatile queues 150 at proper timing. The non-volatile queues are throttled by the Feedback Decoding (FBD) logic 152. The non-volatile memory commands may be interleaved with the volatile memory commands to more efficiently share the same DDR4 bus 140 and 142. The non-volatile memory command queues 153 could hold the write transaction commands with data and read transaction command or cache pre-fetch commands with data mask as described in other embodiments.

The FBD logic 152 couples the host memory controller 100 to an acknowledge/interrupt line 144 from two hybrid memory devices 102 or 103 as feedback signaling. The FBD logic 152 is responsible for more efficiently sharing the data bus 140 by interleaving synchronized volatile memory traffic and nondeterministic non-volatile or persistent memory traffic. The details are described in other embodiments.

The memory bus 140 may use DDR4 protocols or some other bus protocols. The memory bus consists of a data bus 140 and a control bus 142 that may include addresses, chip enables, commands, and/or chip select signals. The various chip select signals (CS) to the memory devices and hybrid memory controllers 102, 103 on the DIMM devices are part of the control bus 142. There are 12 $CS_X$ control signals to guarantee supporting three 8-ranks DDR4 3DS DRAM DIMM devices over the DDR4 memory channel or bus 140 for conventional DRAM-DIMM usages, where the $CS_{9,10, 11,12}$ chip select signals control/access the DDR4-DRAM-DIMM device 180. The chip selection signals 145 comprising $CS_{1,2}$ signals to control/access the hybrid NVM controller then to the DRAM space on the hybrid memory DIMM as 114 and 115, and the $CS_3$ signal to control/access the hybrid NVM controller then to the non-volatile or persistent or flash memories on the hybrid DIMM devices as 124~127 as $CS_{NVM}$. The chip selection signals 143 comprising $CS_{5,6}$ signals to control/access DRAMs on the hybrid memory DIMM as 112 and 113, and the $CS_7$ signal to control/access the non-volatile memories on the hybrid DIMM devices as 120~123. The chip select signals comprising $CS_{4,8}$ signals to schedule the hybrid memory/NVM controller when to share the DRAM space with the host CPU 100. The $CS_4$ and $CS_8$ signals could be modified as scheduler signals for host to inform the hybrid controller 102 or 103 when to use the on-DIMM DRAM chips or to DMA transfer data between DRAMs chips and non-volatile chips on-DIMM as the host is busy to use the DRAM-DIMM 180 or other hybrid DIMM.

An acknowledge/interrupt line 144 is an extension of the normal control bus 142. As discussed subsequently, the acknowledge/interrupt line 144 provides a way for the hybrid memory controllers 102, 103 to provide feedback to the host memory controller 100 when one or more of the hybrid memory controllers 102, 103 have completed the transaction tasks initiated by the host memory controller 100.

One or more volatile memory devices (e.g., DRAM) 180 may be coupled directly to the memory bus 140 (i.e., not through a hybrid memory controller 102, 103). The volatile memory device 180 is controlled by the same protocols as the memory bus 140. For example, if the bus is a DDR4 bus, the volatile memory device is a DDR memory (e.g., DDR4-DRAM). By transmitting read and write commands on the memory bus 140, the host memory controller 100 may directly read from and write to the one or more volatile memory devices 180 coupled directly to the memory bus 140. The control bus 142 portion of the memory bus 140 may provide the chip select signals (CS) with command and address to the volatile memory devices 180.

One or more hybrid memory controllers 102, 103 are coupled to the memory bus 140 and control bus 142. If the embodiment includes the acknowledge/interrupt line 144 being separate from the memory bus 140, this line 144 is also coupled between the hybrid memory controllers 102, 103 and the host memory controller 100.

One or more volatile memory devices 112-115 (e.g., DRAM) are coupled to each of the hybrid memory controllers 102, 103. Additionally, one or more non-volatile memory devices 120-127 are coupled to the hybrid memory controllers 102, 103. As previously discussed, the volatile memory may be any form of volatile memory (e.g., SRAM, DRAM) even though the DRAM is subsequently referred to. Similarly, the non-volatile memory may be NAND flash, phase change memory (PCM), resistive memory, persistent memory, or some other form of non-volatile memory.

Both the volatile memory devices 112-115 and the non-volatile memory devices 120-127 may be individually addressable by the host memory controller 100, through the control bus 142 to their respective hybrid memory controllers 102 or 103. The volatile memory devices 112-115 may also configured by the host as layer 4 (L4) cache memory for the non-volatile memory devices 120-127 coupled to the same hybrid memory controller 102, 103 as the cache memory 112-115 to boost non-volatile memory with the volatile memory performances.

In one example of operation, the host memory controller 100 is configured to handle three DDR4-DRAM devices on the DDR4 channel with four chip select signals ($CS_{1,2,3,4}$) per hybrid memory controller 102, 103 for accessing 4-rank DRAM or 8-rank DRAM devices to maximally utilize DRAM capacities and performances. By adding only one shared ACK signal line with feedback of Pulse Signaling for transaction messages, two of the DRAM devices may be swapped by the hybrid DRAM 112-115 with non-volatile memory devices. The FBD logic 152 may interoperate the feedback signals on the ACK/Interrupt line 144 for the host memory controller 100 to better schedule nondeterministic transaction traffic interleaving among the synchronized traffic from normal DRAM read/write accesses.

Additionally, with the host memory controller 100 configuration of one 4-rank or 8-rank DRAM device and two hybrid memory devices with 2-rank DRAM chips and a higher capacity of non-volatile memories, the host memory controller 100 may schedule the DDR4 bus traffic such as 40% for DDR4-DRAM accesses, 25% for each hybrid DRAM and non-volatile memory. Two chip select signals $CS_{1,2}$ or $CS_{5,6}$ may access the DRAM chips, the $CS_3$ or $CS_7$ may access the hybrid controller 102 or 103 then to the non-volatile memories, and the $CS_4$ or $CS_8$ may be used for the controller 100 to inform each of hybrid controllers 102 or 103 when more than 60% of time slots are for their local usages of the DRAM chips and when to send transaction ACK and error messages (as described subsequently) to the shared ACK/Interrupt signal line 144 to the host processor's FBD logic 152.

Figure 2:
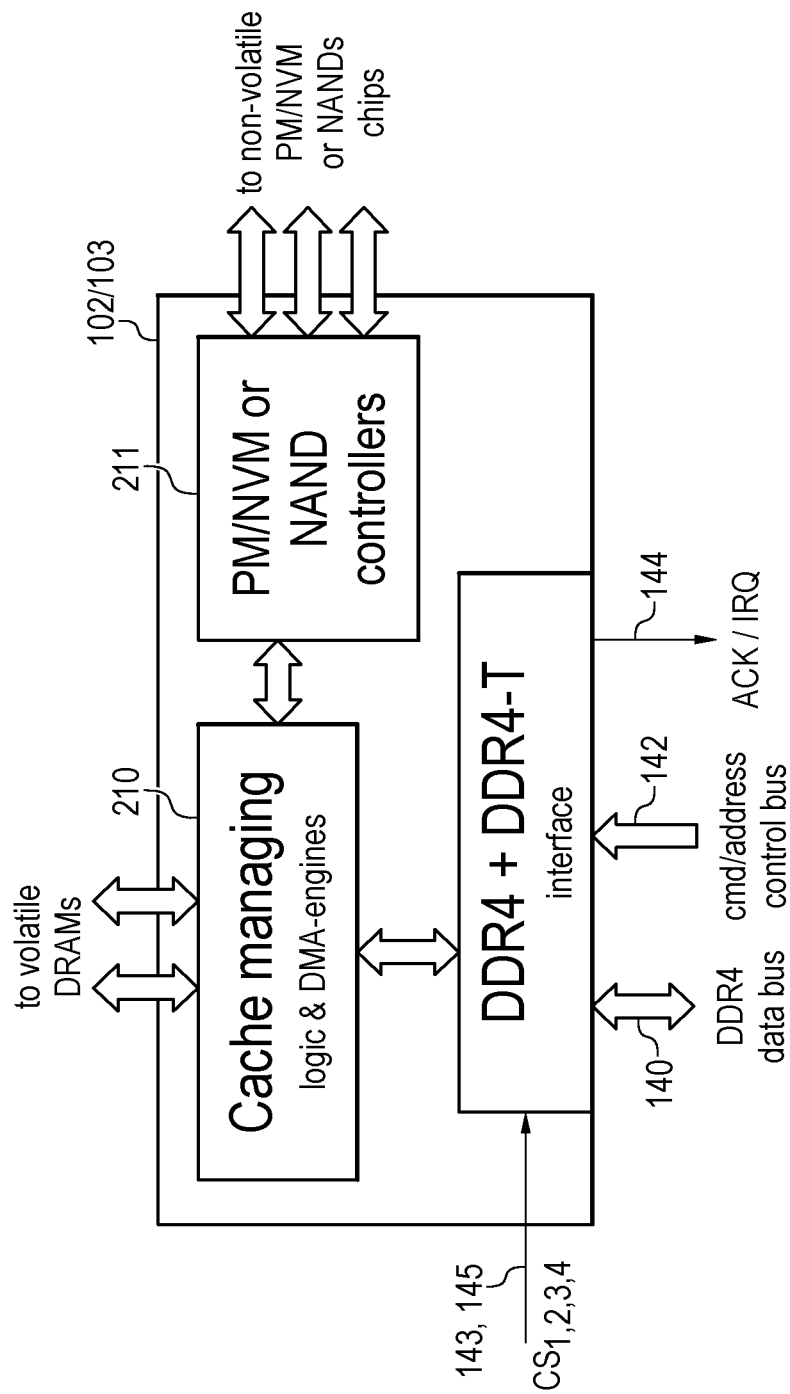
FIG. 2 illustrates a block diagram of a hybrid memory controller, in accordance with various embodiments.

FIG. 2 illustrates a block diagram of a hybrid memory controller 102 or 103, in accordance with various embodiments. This block diagram is for purposes of illustration only as other functions may be implemented in each hybrid memory controller 102, 103.

Each hybrid memory controller 102, 103 may include a host interface 213 that couples its respective hybrid memory controller 102, 103 to the memory bus 140. The host interface 213 may translate the bus signals back into the data, commands, and addresses transmitted by the host memory controller 100. The host interface 213 may also translate data read from one of the memories 112-115, 120-127 coupled to the respective hybrid memory controller 102, 103 into appropriate bus signals to be transmitted on the memory bus 140 to the host memory controller 100.

The host interface 213 also generates the acknowledge/interrupt line 144 to the host memory controller 100 when the data requested by the host memory controller 100 is ready to be transmitted on the memory bus 140. This line signals the host memory controller 100 that the data is ready so that the host memory controller 100 can generate a read command to transfer the desired data from the memories 112-115, 120-127 coupled to the respective hybrid memory controller 102, 103 to the host memory controller 100. As one example, the acknowledge/interrupt line 144 may be an active low signal. Thus, when read data is ready to be read by the host memory controller 100, the hybrid memory controller 102, 103 brings the acknowledge/interrupt line 144 low to interrupt any processes being executed by the host memory controller 100 so that the host memory controller 100 can request transfer of the data to the controller 100.

The chip select control lines (CS) are coupled to the host interface 213 to enable the appropriate hybrid memory controller 102, 103 as determined by an address sent by the host memory controller 100. The chip select lines may include one or more chip select signal lines. For example, a chip select signal may be provided for each non-volatile memory device that is coupled to the respective hybrid memory controller 102, 103. In an embodiment, the chip select lines are active low. However, another embodiment may use an active high chip select.

The hybrid memory controller 102, 103 may apply two pulses in one clock width to the ACK/Intr feedback line 144 after it receives the write transaction command when the hybrid memory controller's buffers are close to full or short of buffer credits. This may be used to throttle the host write transaction pace. The block write transactions between DRAM cache and non-volatile memory transfers data to the DRAM cache first then issues the write transaction command with proper address pointing to the non-volatile memory regions. The hybrid memory controller 102, 103 throttles the DMA writing pace from the DRAM cache to the non-volatile memory.

In operation, the host memory controller 100 generates memory commands such as DRAM commands for writing (WR), reading (RD), bank activating (ACT) and refreshing (REF). The host memory controller 100 transmits these commands to the respective hybrid memory controller 102, 103 that is coupled to the volatile memory being addressed. The hybrid memory controller 102, 103 then forwards the command to the addressed memory device as determined by the address and chip select signals on the memory bus.

The host memory controller 100 also generates non-volatile memory access commands ($NVM_{CMD}$) such as $NVM_{read}$ to initiate a transaction read operation and $NVM_{write}$ to initiate a write operation, $NVM_{regR}$ transaction and $NVM_{regW}$ to read or write the hybrid controller's registers. These commands are also sent to the hybrid memory controllers 102, 103 to instruct the respective hybrid memory controller 102, 103 to initiate a transaction operation.

As defined herein, a transaction is a data transfer operation from one memory device to another memory device that are both coupled to the same respective hybrid memory controller 102, 103. For example, a read transaction command ($NVM_{read}$) causes the transfer of data from an addressed non-volatile memory device 120-127 to one of the DRAMs 112-115 coupled to the respective hybrid memory controller 102, 103 and acting as a memory cache. Similarly, a write transaction command ($NVM_{write}$) causes the transfer of data from an addressed volatile non-volatile memory device 112-115, acting as a memory cache, to one of the non-volatile memory devices 120-127 coupled to the respective hybrid memory controller 102, 103.

As an example of operation, the host memory controller 100 transmits one of the $NVM_{read}$ or the $NVM_{write}$ commands on the control bus 142. The command includes the address to be read from or written to in addition to the appropriate chip select signal being brought to an active state. The selected hybrid memory controller 102, 103 receives the transaction command and the DMA engine 210 of that respective controller 102, 103 causes the transfer of data to occur in the background without interaction by the host memory controller 100.

A single transaction command from the host memory controller 100 causes these data transfers to occur in the background (e.g., the host memory controller does not participate). For a write transaction, the data is first written to the DRAM by the hybrid memory controller 102, 103 and then the DMA engine automatically transfers the data to one of the non-volatile memory devices 120-127 in the background at a proper timing. Similarly, for a read transaction, the data is read from the non-volatile memory device and then the DMA engine automatically transfers the data to one of the volatile memory devices 112-115 as a memory cache until the host memory controller 100 has been interrupted by the acknowledge/interrupt line and performs another read operation to retrieve the data from the cache. The host may write a 128 B cache-line to the hybrid memory controller in DRAM write latency. The hybrid memory controller may then write this cache-line to a selected volatile memory location as cache hit NVM write transaction. The hybrid controller DMA writes 16 KB cold super page to the PM/NVM or 3D-XP memories in 1 KB burst writes to more efficiently use the PM/NVM devices later on, by lease recently used (LRU) criteria in order to free cache space for new writes, in cache miss rate only, rather than full write throughputs. The cache hit reads or writes perform on the volatile memories, the cache miss operations would perform on the non-volatile memories, only cold data in the LRU cache needed to DMA write to non-volatile memories.

Figure 5:
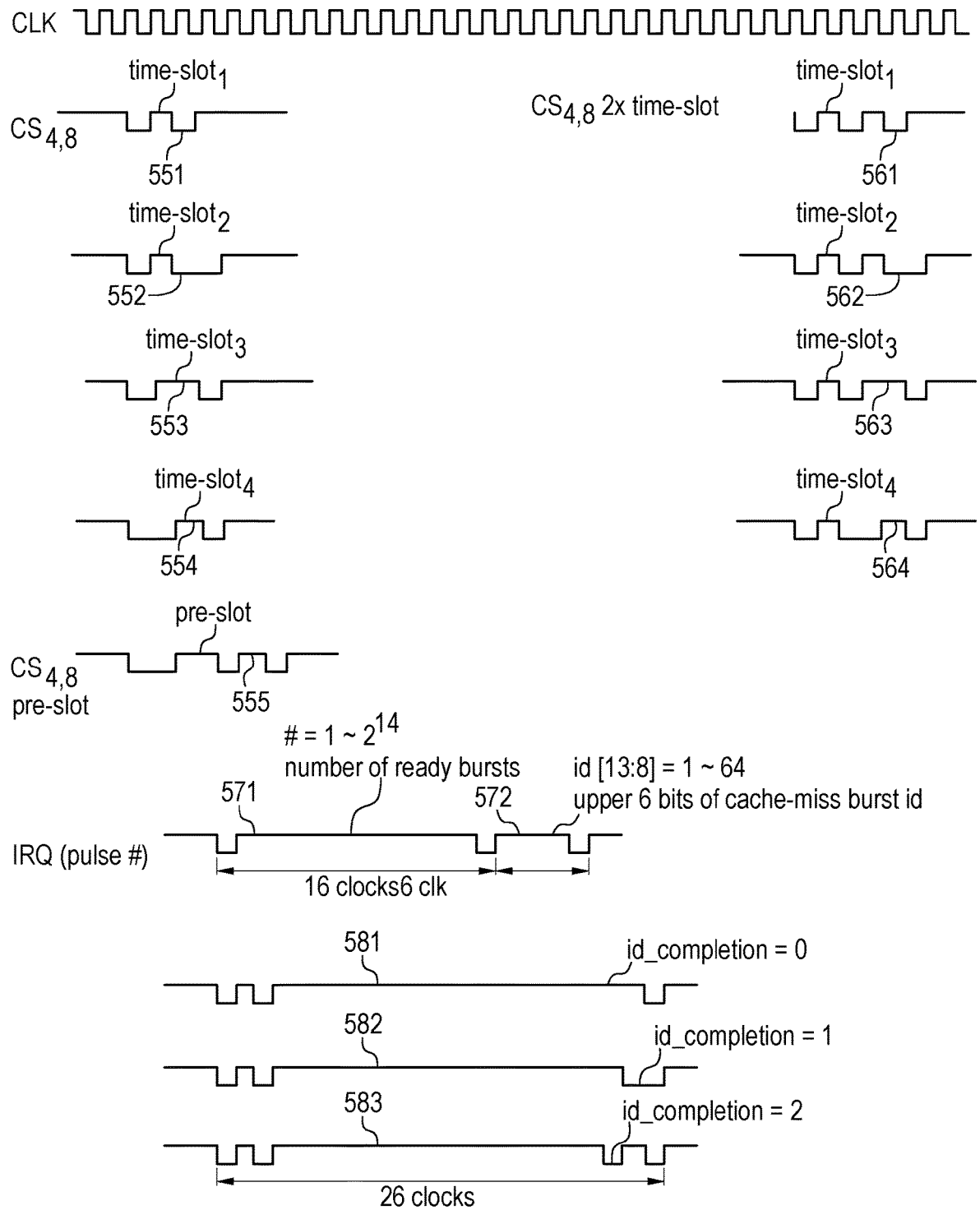
FIG. 5 illustrates details of the schedule signals, in accordance with various embodiments.

The host may also read a 128 B cache-line. The hybrid controller then reads 1 KB from 8 PM/NVM chips, as auto prefetch all neighboring data to the hybrid controller's cache then writes this 1 KB of data to a hybrid DRAM as L4 cache, as the hybrid DRAM has enough bandwidth. A prefetch hit-mask can be updated to indicate this prefetch-hit or the hit-mask can mark the partially cached 1 KB data in case of the hybrid DRAM did not have enough bandwidth. More detailed operation of these operations is illustrated in FIGS. 5 and 6.

FIG. 3 presents a DDR4 Command Truth Table 300 for normal DRAM accesses within that the 18 bit WR command is redefined as transaction register write command $NVM_{regW}$ [13:0] with 3 bit CRC referred by 301, the 18 bit RD command is redefined as transaction register read command $NVM_{regR}$ [13:0] with 3 bit CRC referred by 302, the 21 bit ACT command is redefined as NVM cmd [37:0] with 4 bit CRC referred by 303 where the A17 control bus signal is "0" for $ACT_0$ and "1" for $ACT_1$. The NVM cmd [37:0]=CMD [2:0], mode[1:0], Bank[3:0], $NVM_{address}$ [28:0] for 1 TB by 128 B cache-line accesses or 32 TB by 4 KB block accesses referred as 304 and examples are detailed in other embodiments. The PM/NVM chips read/write access could be 16 B burst by 8 bit bus, from 8 chips to aggregate into a 128 B burst on DDR4 bus by hybrid controllers referred as. The DDR4-PM/NVM read/write burst would be set as BL16 on 64 bit DDR4 data bus referred as 322. The bank activate command ACT sequences could be easily expanded from 38 bit to 57 bit, 76 bit, or more as needed referred. Those embodiments detailed how a NVM command could be inserted into volatile command queues for execution at proper timing.

Figure 4:
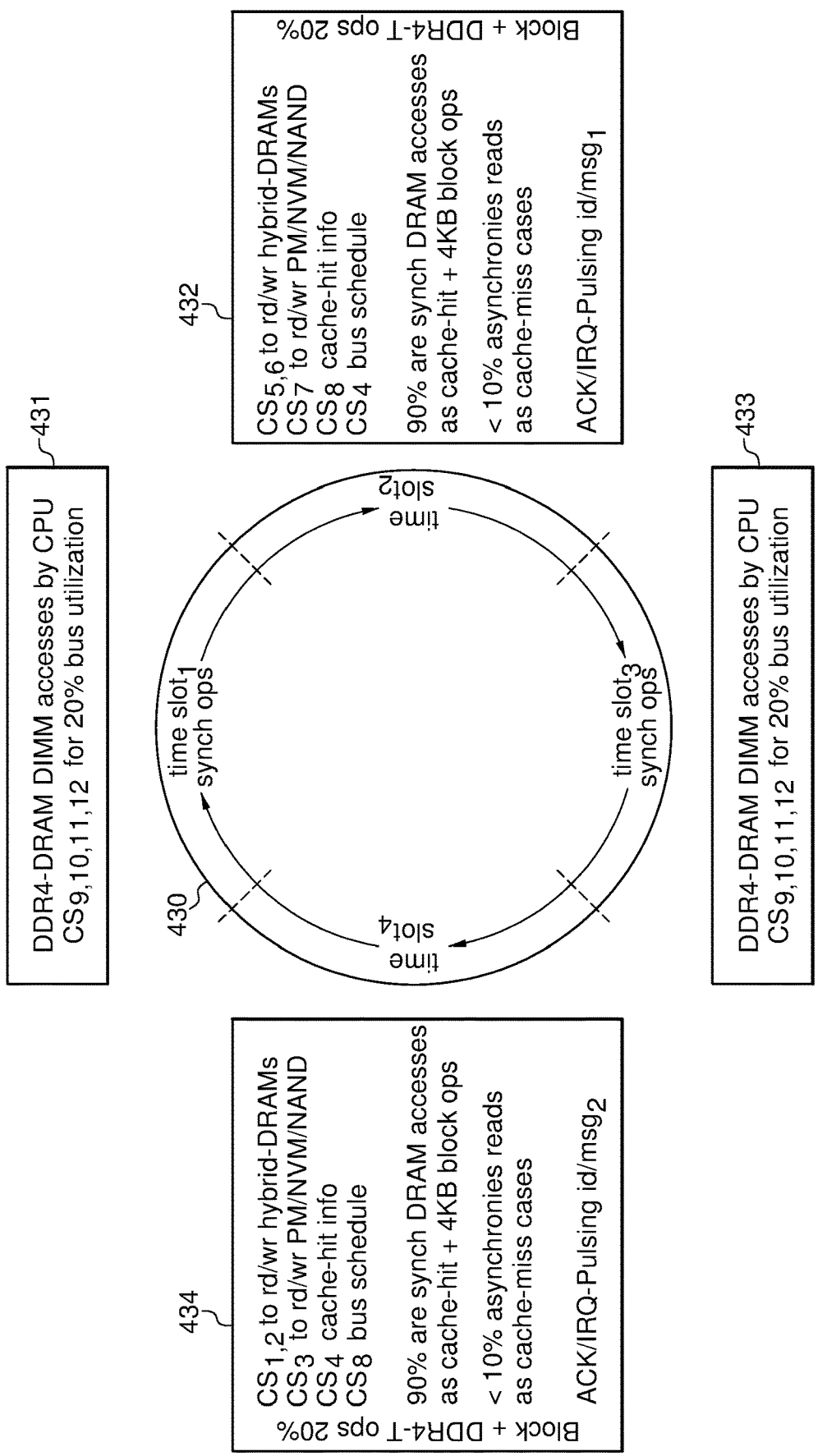
FIG. 4 illustrates a time scheduler for host to interleave DRAM-Dual In-line Memory Module (DIMM), Hybrid-DIMM1 and Hybrid-DIMM2 traffic, in accordance with various embodiments.

FIG. 4 illustrates an embodiment of timing scheduler 430 as the time-slots for one DRAM-DIMM device and two hybrid memory DIMM devices for CPU round-robin accessing each DIMM devices and inform hybrid controllers when to use the on-DIMM DRAMs. The time-slot$_1$ and time-slot$_3$ is for host CPU to access the DDR4-DRAM DIMM device by $CS_9$, $CS_{10}$, $CS_{11}$, $CS_{12}$ control signals for synchronized traffic in about 20% bus utilization referred as 431 and an additional 20% bus utilization as 433 for a total of 40% of bus utilization for the host to access the DRAM-DIMM device.

The time-slot$_2$ is for host CPU to access the hybrid memories in about 20% bus utilization of DDR4, DDR4-T, and Block accesses referred as 432. That the DRAMs 112, 113 by $CS_5$, $CS_6$ control signals and the PM/NVM or NAND chips by $CS_7$ control signal with the $CS_8$ providing cache-hit info to control the hybrid memory controller 102, and the $CS_4$ bus schedule could inform the other hybrid memory controller 103. There could be 80%~90% synchronized DRAM accesses as cache-hit transactions and 4 KB block transactions, less than 10% nondeterministic transaction traffic most likely the cache-miss reads. The acknowledgment/interrupt request (ACK/IRQ)-pulsing ID or error-message feedback signal could help host CPU to identify the read bursts on the DDR4 data bus 140.

The time-slot$_4$ is for host CPU to access the hybrid memories in about 20% bus utilization of DDR4, DDR4-T, and Block accesses referred as 434. That the DRAMs 124, 125 by $CS_1$, $CS_2$ control signals and the PM/NVM or NAND chips by $CS_3$ control signal with the $CS_4$ providing cache-hit info to control the hybrid memory controller 103, and the $CS_8$ bus schedule could inform the other hybrid memory controller 102. There could be 80%~90% synchronized DRAM accesses as cache-hit transactions and 4 KB block transactions, only about 10% nondeterministic transaction traffic most likely the cache-miss reads. The ACK/IRQ-pulsing id or err-msg feedback signal could help host CPU to identify the read bursts on the DDR4 data bus.

The host uses the scheduling signal $CS_4$ to inform the hybrid memory controller 103 the time-slots when to use the on-DIMM DRAMs for DMA transfer data between the DRAMs and PM/NVM or NAND chips as executing the read/write transactions or cache accelerations. There are more than 60% times for the hybrid memory controller to access DRAMs as time-slot$_{1,3}$ as host is busy on DRAM-DIMM device, and time-slot$_2$ or time-slot$_4$ as host is busy working on another hybrid memory DIMM devices 102 or 103. The host uses the scheduling signal $CS_8$ to inform the hybrid memory controller 102 the time-slots when to use the on-DIMM DRAMs for DMA transfer data between the DRAMs and PM/NVM or NAND chips as executing the read/write transactions within about 60% times period.

FIG. 5 illustrates timing diagrams of the scheduling control signals $CS_4$ and $CS_8$ pulses that the 2 pulses waveform 551 is for time-slot$_1$, 552 is for time-slot$_2$ 553 is for time-slot$_3$ and 554 is for time-slot$_4$. The 3 pulses waveform 561, 562, 563, 564 are for time-slot$_{1,2,3,4}$ with double time durations as need. The pulses waveform 555 is for host to inform the hybrid memory controller 102 or 103 the time-slot$_2$ or time-slot$_4$ is coming to force it to finish local DRAMs accesses. The hybrid controller 102 or 103 could use the IRQ interrupt pulses at time-slot$_1$ to inform the host the number of ready burst data held in cache of hybrid controller 102 as 571 negative pulses then the burst sequence id in 16 clocks, the upper 6 bits in 6 clocks, or at time-slot$_3$ for hybrid controller 103 to work. The pulse signaling timing diagram 581~583 illustrate the 26 clocks to carry 24 bit completion id from 0 to $2^{23}-1$ for the hybrid controller 102 or 103 to inform the host the NVMe block read/write transactions finished, during the DRAM DIMM time-slot$_{1\ or\ 3}$.

Figure 6A:
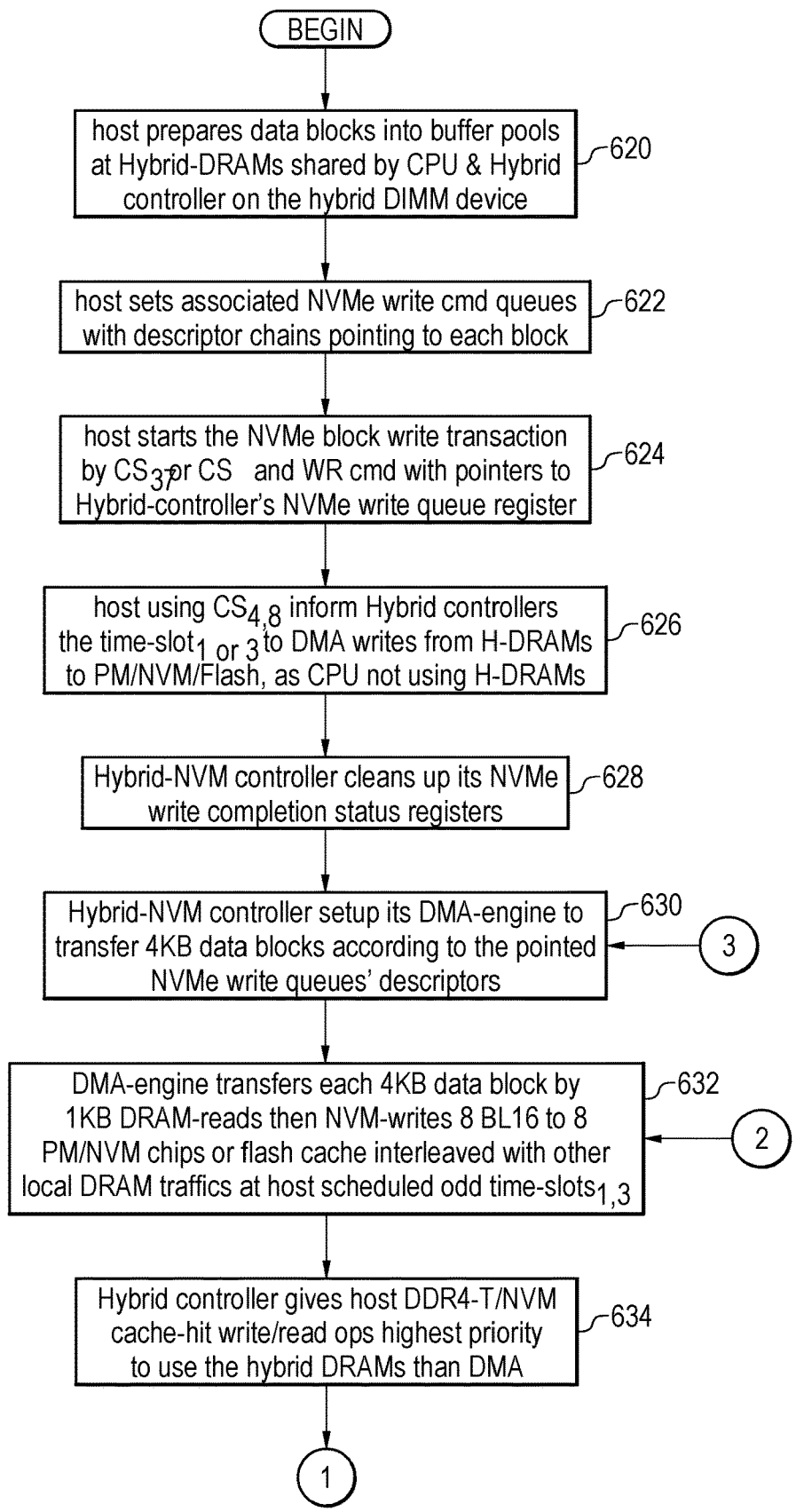
FIGS. 6A, 6B illustrate a flow chart of NVMe block write transactions to the PM/NVM/NAND devices over DDR4 memory channel, in accordance with various embodiments.
Figure 6B:
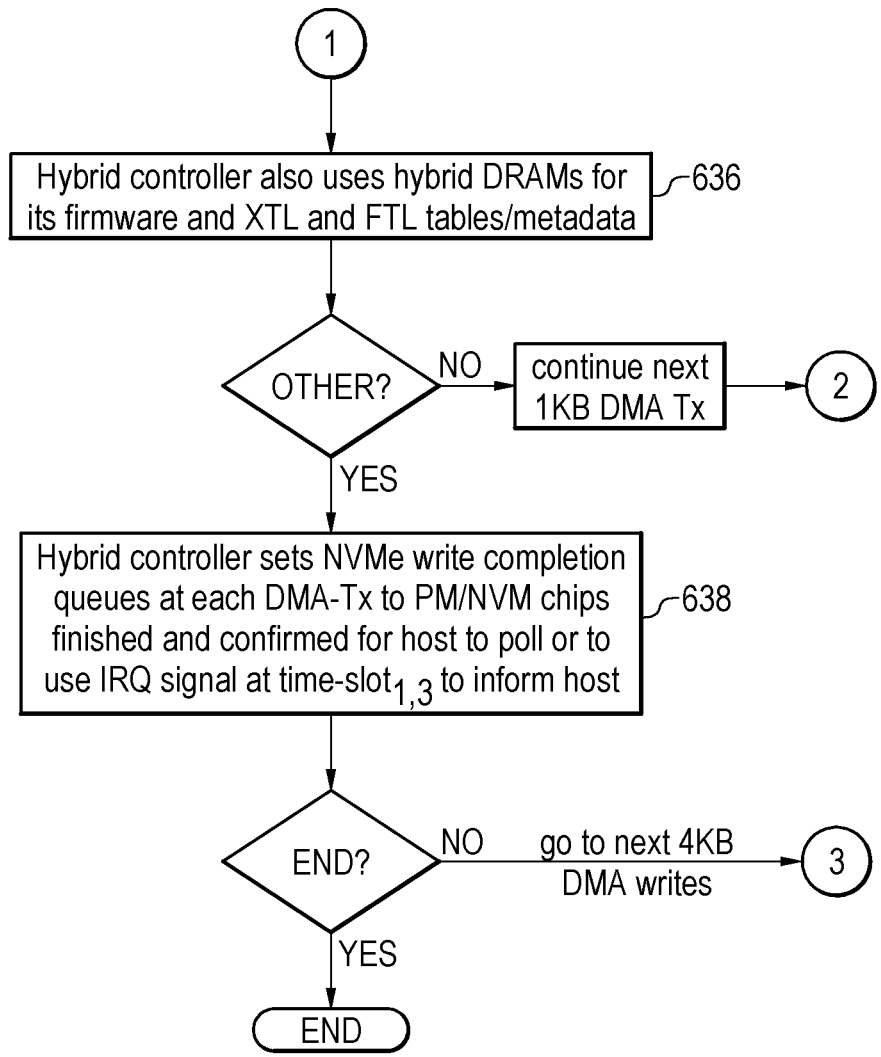

FIGS. 6A, 6B illustrate a flow chart of NVMe block write transactions that could 100% use the volatile memory DRAMs to carry out the nondeterministic 4 KB write transactions. The host could starts to prepares the data blocks into buffer pools at the hybrid DRAMs shared by host and hybrid controller as task 620, and setup associated NVMe write command queues with descriptor chains pointing source data to those 4 KB blocks in buffer pools as task 622 by $CS_{1,2}$ or $CS_{5,6}$ as volatile memory writes, then starts the NVMe write transactions by $CS_3$ or $CS_7$ and WR command with the point to the hybrid controller's NVMe write queue register as task 624 similar as PCIe door-bell register and triggering NVMe execution mechanism.

The hybrid controller cleans up NVMe write completion status registers, setup its DMA-engine to transfer 4 KB data blocks in DRAMs according to the NVMe write queues descriptors as task 628 and 630. The DMA-engine transfers each 4 KB data block by 1 KB DRAM reads then write 4×16 of BL16 bursts to the PM/NVM chips or flash cache, interleaved with other local DRAM traffic at host scheduled time-slots$_{1 \text{ or } 3}$ as task 632. Hybrid controller gives the host NVM/DDR4-T cache-hit write/read traffic highest priority to use the hybrid DRAMs that could interrupts block DMA traffic to insert few burst or cache-line accesses to the DRAMs as task 634, hybrid controller also uses hybrid DRAMs for its firmware and XTL and FTL tables and metadata that could also interrupt DMA traffic as task 636. The DMA-engine will continue next 1 KB transfers to loop 632 ops until it finishes this 4 KB data transfer from hybrid DRAMs to the PM/NVM or NAND space.

Hybrid controller sets the NVMe write completion queues at each DMA-write transfer data to the PM/NVM or NAND chips finished and committed for host to poll the completion status or to use the IRQ signal line to interrupt the host for quick response at time-slot$_{1,3}$ by the completion id number of the NVMe block write transaction as previous embodiment shown in timing diagram 581~583 where the time-slot$_{2,4}$ are dedicated for host to use the hybrid DRAMs or hybrid controller to handle cache-hit operations as task 638. It continues 4 KB DMA write transfers to loop 630 as NVMe write queues are not end.

Figure 7A:
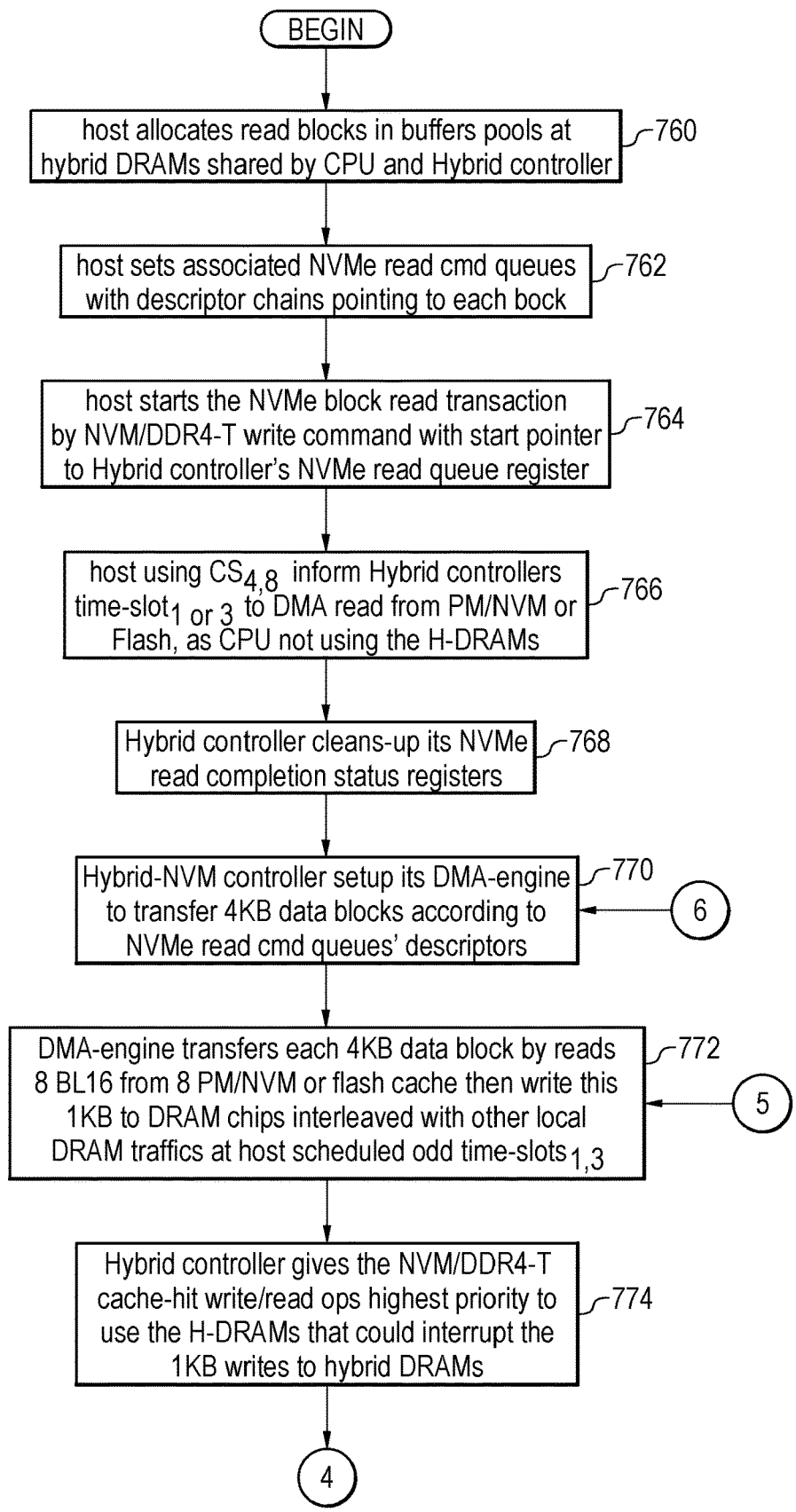
FIGS. 7A, 7B illustrate a flow chart of NVMe block read transactions to the PM/NVM/NAND devices over DDR4 memory channel, in accordance with various embodiments.
Figure 7B:
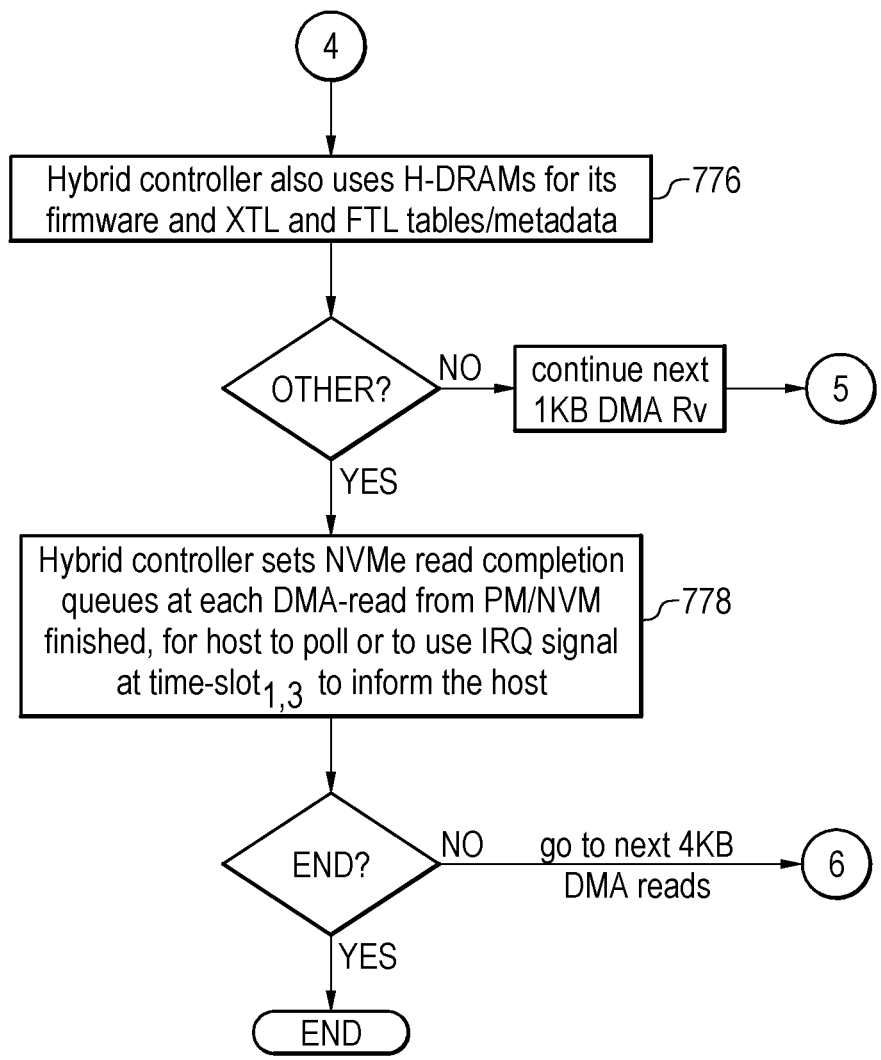

FIGS. 7A, 7B illustrate a flow chart of NVMe block read transactions. The host allocates read blocks in buffers pool of at hybrid DRAMs shared by host and hybrid controller as task 760, host sets associated NVMe read command queues with descriptor chains pointed to each block as destination address by volatile write to hybrid DRAMs in time-slot$_{1,3}$ as task 762, it starts the NVMe block read transactions by CS$_3$ or CS$_7$ and NVM write the start pointer of NVMe write command queues to the hybrid controller NVMe read queue register as task 764, and host use CS$_{4,8}$ schedule signal to inform the hybrid controller to DMA read transfers 4 KB data blocks to the hybrid DRAMs as host is busy working on DRAM-DIMM in time-slot$_{1,3}$ as task 766.

The hybrid controller cleans up its NVMe read completion status register and setup its DMA-engine to read transfer 4 KB data according to the NVMe read queues source LBA (logic block address) and destination addresses of hybrid DRAM as task 768 and 770. The DMA-engine transfers each 4 KB data block by reads 8 BL16 from 8 of PM/NVM or flash chips then writes this 1 KB (8×8×16 B) to hybrid DRAM chips interleaved with other local DRAM traffic at host scheduled odd time-slot$_{1 \text{ or } 3}$ when host is busy working at DRAM-DIMM as task 772. Hybrid controller gives the NVM/DDR4-T cache-hit write/read ops highest priority to use the hybrid DRAMs and also uses hybrid DRAMs for its firmware and XTL/FTL tables and metadata that local DRAM traffic could interrupt DMA read transfer 1 KB as the task 774 and 776. It loops back to task 772 for more 1 KB reads until to complete a 4 KB block.

Then, in task 778, hybrid controller sets the NVMe read completion queues at each DMA read from PM/NVM or flash finished for host to poll or to use IRQ signal at odd time-slot$_{1,3}$ to inform the host by the completion id number of the NVMe block read transaction. It loops back to task 770 for next 4 KB block transfers until the entire NVMe read queues are processed.

Figure 8:
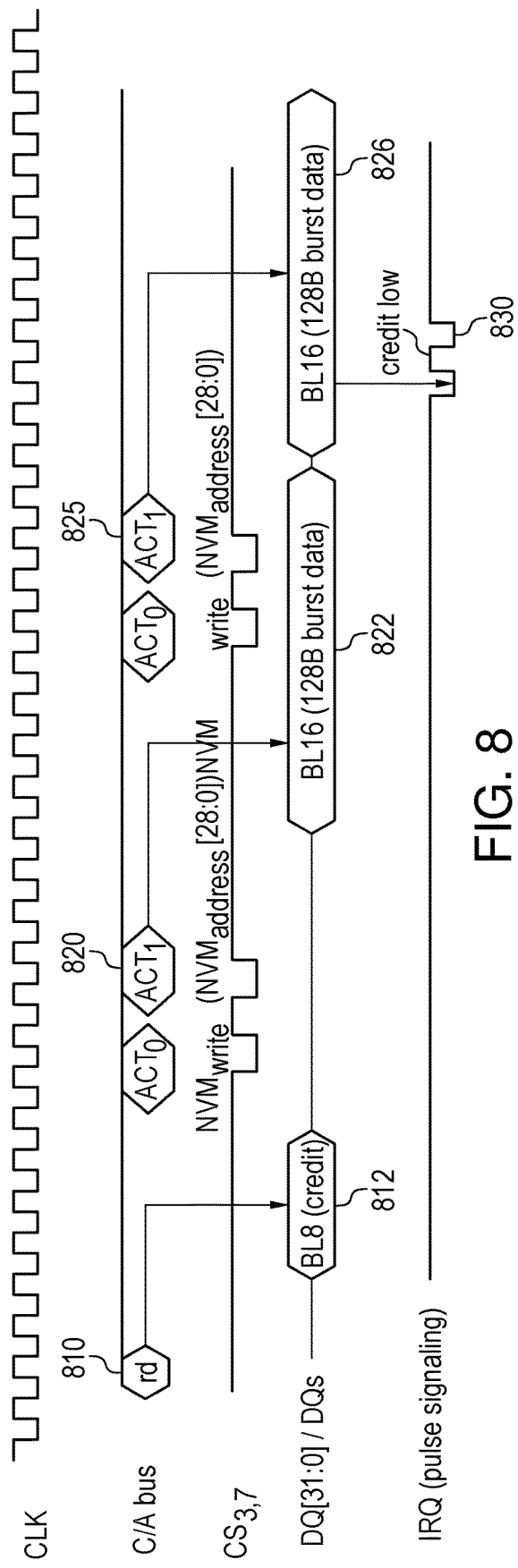
FIG. 8 illustrates a timing diagram of write transactions for cache-hit cases, in accordance with various embodiments.

FIG. 8 illustrates timing diagrams of NVM 128 B write transactions that the host uses command/address bus to issue RD command to at 810, and obtained the 32 Bytes of buffer credits from the assigned hybrid controller on the DDR4 data bus at 812, then host starting NVM$_{write}$ commands with NVM$_{address}$ [28:0] at 820 and 825 by C/A control bus with 128 B burst data on DDR4 data bus at 822 and 826. The IRQ signal line would send the warning for credit low by two negative pulses to let the host slow down NVM write transactions as 830, and the IRQ signal could be four negative pulses as write-cache in hybrid DRAMs is full to throttle down the NVM write transaction pace.

The embodiment redefined the DRAM bank activation command ACT$_0$ as NVM$_{cmd}$[2:0]=A$_{16}$A$_{15}$A$_{14}$, Bank[3:0]= BG[1:0] BK[1:0], mode[1:0]=A$_{13}$A$_{12}$, NVM$_{address}$[28:17]= A[11:0], as A17=0; ACT$_1$=NVM$_{address}$[16:14]=A$_{16}$A$_{15}$A$_{14}$, CRC[3:0]=BG[1:0] BK[1:0], NVM$_{address}$[13:0]=A[13:0], as A17=1; where the NVM$_{cmd}$[2:0] could be NVM$_{write}$=000b, NVM$_{read}$=001b, NVM$_{prefetch}$=011b.

Figure 9:
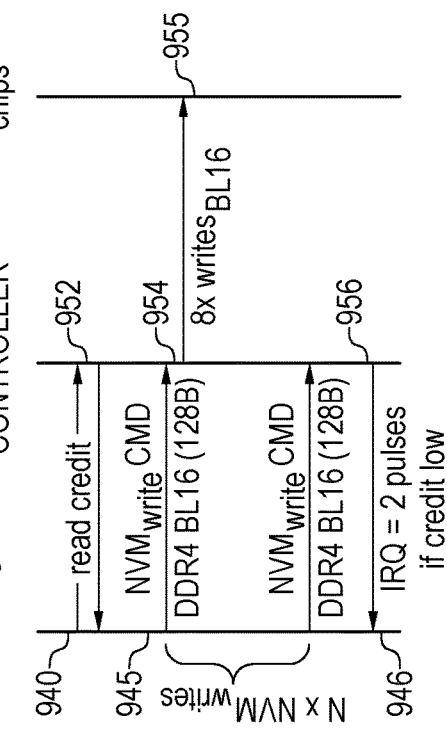
FIG. 9 illustrates write transaction interactions among the host CPU and Hybrid controller and PM/NVM/NAND chips, accordance with various embodiments.

FIG. 9 illustrates the interactions among the host and hybrid controller and PM/NVM or Flash chips that the host CPU uses CS$_3$ and RD command to read the hybrid controller's NVM write buffers credit at time 940, the hybrid controller reports its buffers credit to the host at 952, host sends NVM write command with BL16 (8×16 B=128 B) data burst to the hybrid controller at time 945; hybrid controller received the 128 B at 954, and then write 8× BL16 to the PM/NVM memory or the NAND flash chips as 955. The host can repeat the NVM write transactions until the hybrid buffers credit is low then hybrid controller can use IRQ signal line with 2 negative pulses to interrupt the host write transactions to throttle the write transactions pace. The NVM write transactions are always cache hit such that the hybrid controller buffers all received 128 B data in its cache then write them into the hybrid DRAMs as L4 cache.

Figure 10:
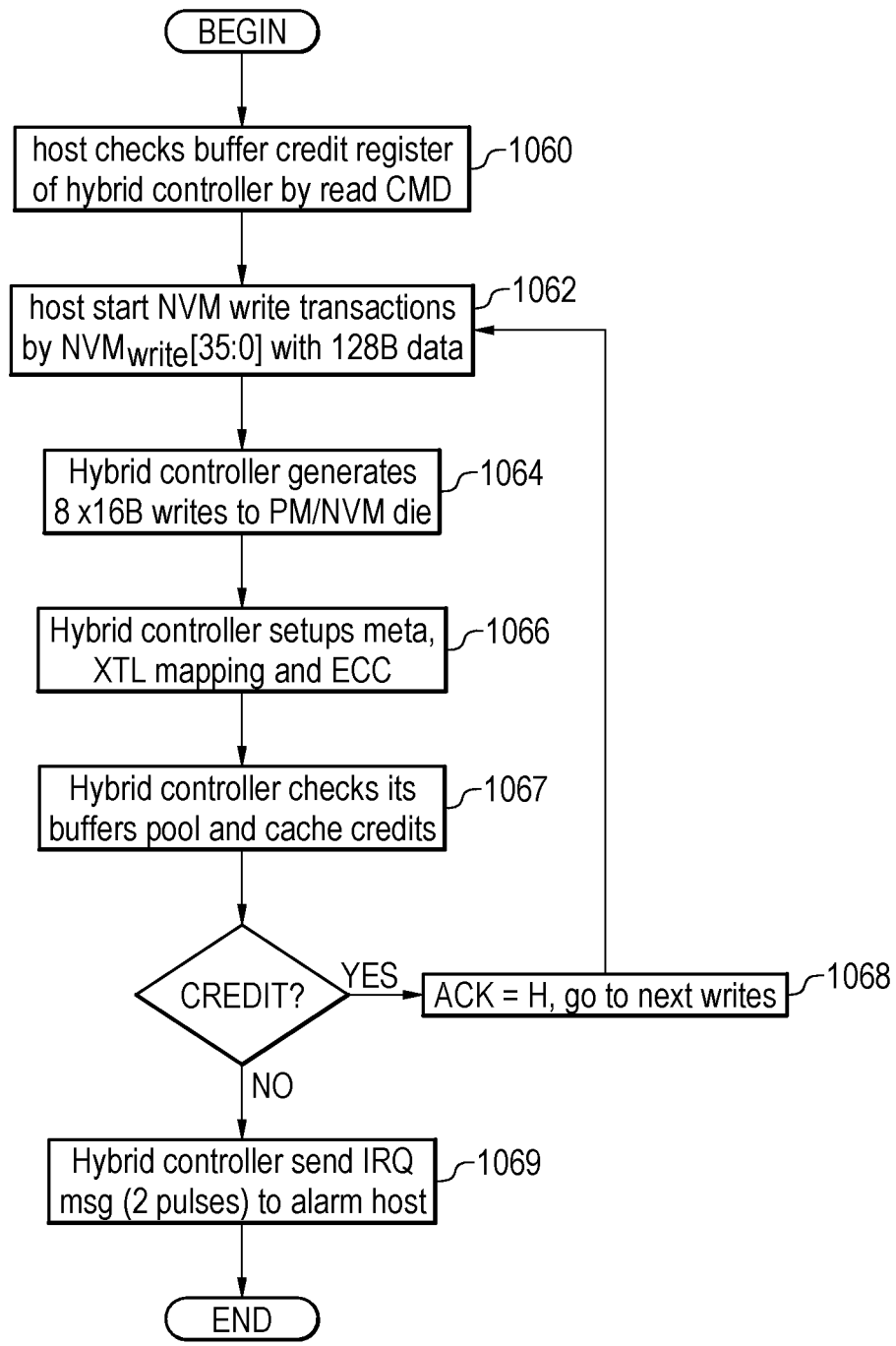
FIG. 10 illustrates a flow chart of write flow chart, in accordance with various embodiments.

FIG. 10 illustrates a flow chart of NVM write transactions that the host reads the hybrid controller's buffers credit register as task 1060, then host starts NVM write transaction command NVM$_{write}$[35:0] with 128 B data to the hybrid controller as 1062. The hybrid controller generates 8×BL16 writes to one die of PM/NVM chips for PM memory access efficiency as task 1064, it also setups related metadata, XTL mapping table and ECC as task 1066. At task 1067, the hybrid controller checks its on-die buffers credit and DRAM cache credit, in order to use IRQ signal line to interrupt the host, at task 1069, to throttle or slow down host write transactions. The hybrid controller could over-write the read buffers in its cache to buffer the 128 B write transaction bursts or cache-lines if the buffer credit is gone but host continues write new 128 B to the hybrid controller because of the PM/NVM chips have much better read latencies than write ops.

Figure 11A:
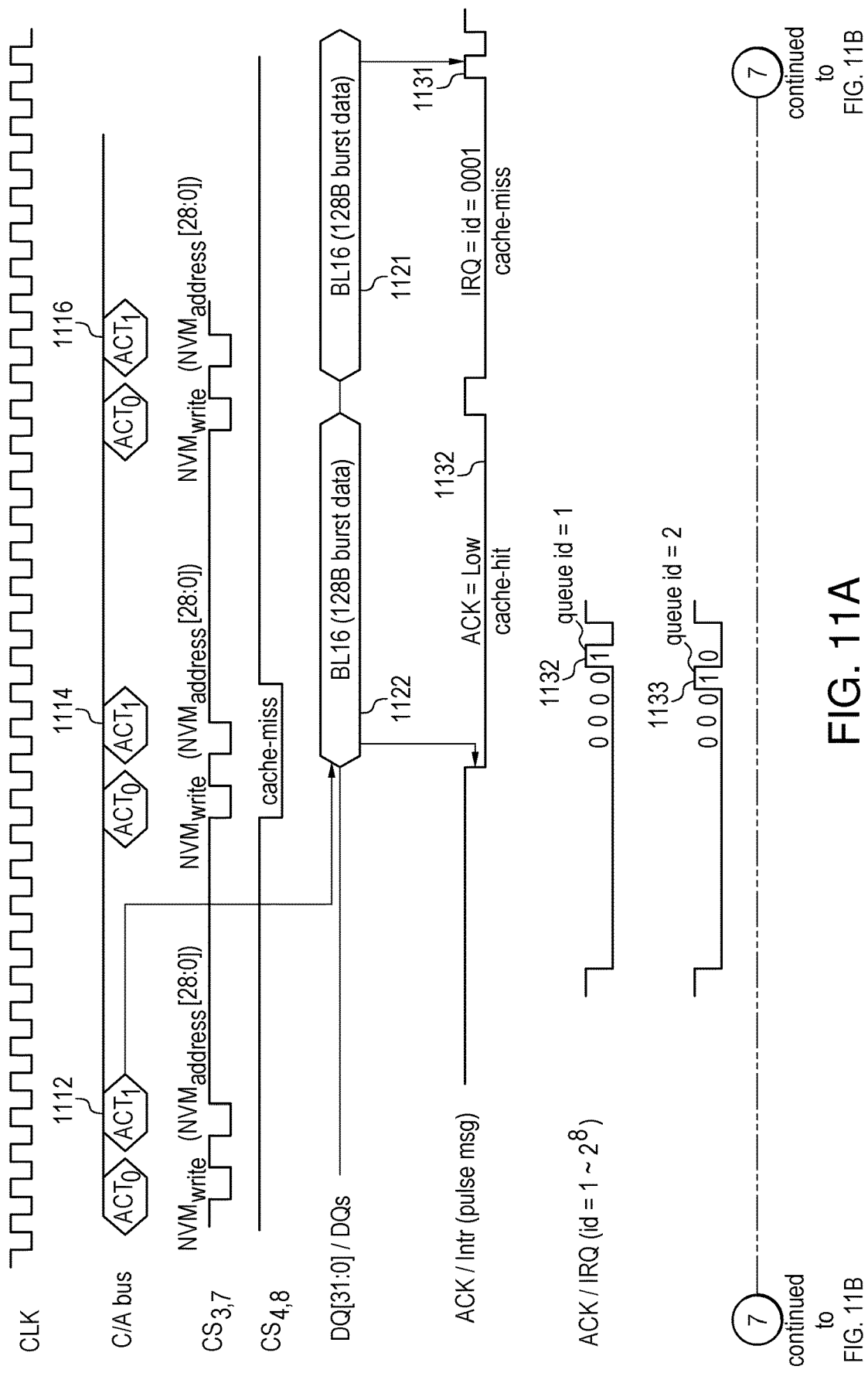
FIGS. 11A, 11B illustrate a timing diagram of read transactions for cache-hit and cache-miss cases, in accordance with various embodiments.
Figure 11B:
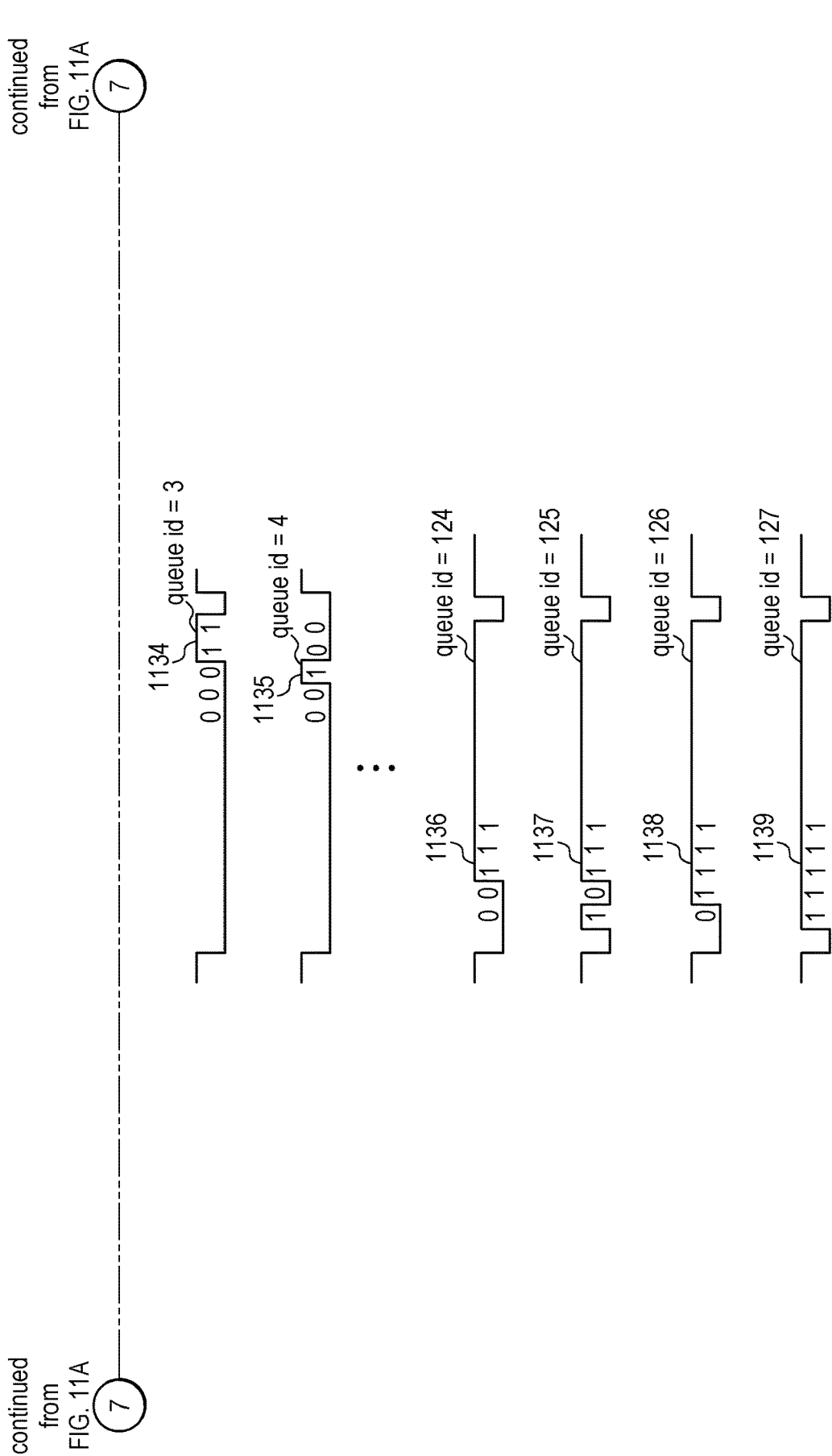

FIGS. 11A, 11B illustrate timing diagrams of NVM 128 B read transactions and ACK/IRQ feedback signaling between the host and hybrid controllers that the host issues NVM read command with CS$_{3 \text{ or } 7}$ to the hybrid controller at timing 1112, the hybrid controller reads the 128 B from hybrid DRAMs (L4 cache) and then deliver the data to the host by DDR4 DQ[71:0] data bus as cache-hit read transaction done at timing 1122 with an ACK=Low at the shared feedback signal link for 8 clock cycles at timing 1132 to close this NVM read transaction with the host. The host could continue issues other NVM read transaction commands at timing 1114 and 1116, the hybrid controller could give host a previous cache-miss read 128 B on DQ[71:0] data bus at timing 1112 from its buffers with IRQ pulses of cache-miss queues ID within 8 clock cycles at timing 1131, as this is a cache-miss read without data output. The number of previous cache-miss read data available is 1~16K and the cache-miss queues ID could be 13 bit long as described in previous embodiments 571 and 572, the hybrid controller informed the host how many data bursts held in its buffers and the upper 6 bit of the ID numbers at the odd time-slot$_{1,3}$ ahead the NVM read transactions at the even time-slot$_{2,4}$. The timing diagrams 1132~1135 showed the lower 7 bit of cache-miss queues ID is 1~4, and timing diagrams 1136~1139 showed the queues ID 124~127 for host to parse out the 13 bit cache-miss queues ID of each 128 B burst data or cache-line. The hybrid controller could hold DQ[71:0] in Tri-state without data with only the IRQ signal as lower 8 bit cache-miss queue ID=1, and the previous number of ready bursts=0 and upper cache-miss queue ID=0, to inform the host this is cache-miss read case.

Figure 12:
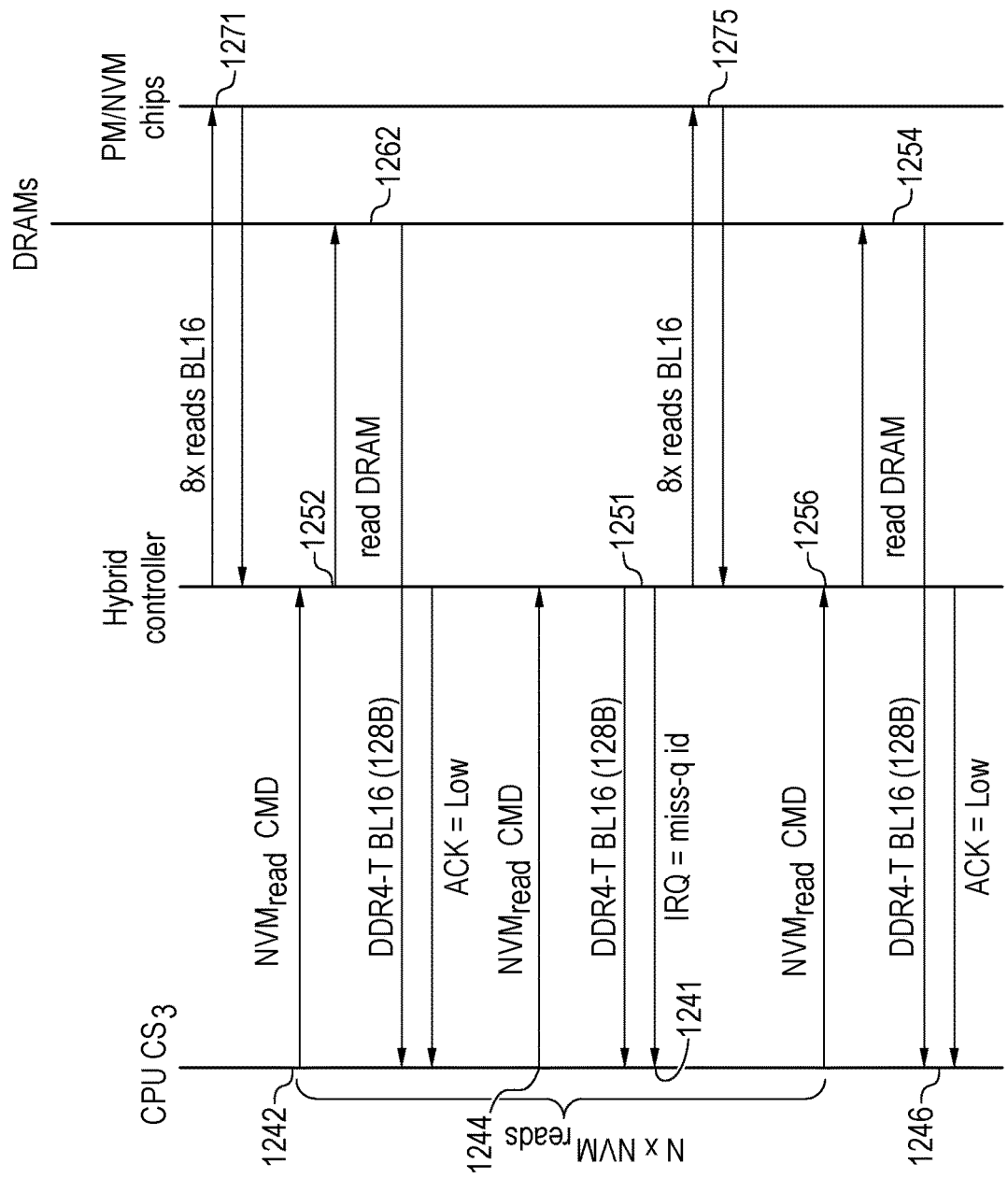
FIG. 12 illustrates read transaction interactions among the host CPU and Hybrid controller and DRAM cache and PM/NVM/NAND chips, in accordance with various embodiments.

FIG. 12 illustrates the interactive operations among CPU, hybrid controller, DRAM chips, and PM/NVM chips. The host issued the NVM$_{read}$ commands at timing 1242, 1244, and 1246, the hybrid controller read from the L4 cache DRAMs at timing 1252 as it detected the cache-hit or informed by host CS$_{4,8}$ signal. The hybrid controller fetch the 128 B data from 8 DRAM chips and put them on the DDR4 data bus with the ACK=Low signal to close this NVM read transaction at timing 1262, The hybrid controller could put the 128 B from its cache read-miss buffers on the DDR4 data bus with the IRQ=ID of cache-miss read queues at timing 1251 for host to close this previous cache-miss NVM read transaction at time 1241. The hybrid controller could send 8× read BL16 to one of the 8 PM/NVM chips or prefetch from all 8 PM/NVM chips as 8×8×16 B=1 KB, to more efficiently using the PM/NVM chipsets for lowest latencies at timing 1275 then hold the data in its buffers for future reads. The hybrid controller read 128 B from DRAMs at timing 1256 then put data on the DDR4 data bus at timing 1254 to close another cache-hit NVM read transaction to the host at timing 1246. The hybrid controller writes and reads the 8 DRAM chips in parallel, writes or reads a 128 B burst to one PM/NVM die addressed from 8 or 16 PM/NVM chips, or writes/reads 1 KB for much more efficient accesses from 8 PM/NVM chips in parallel as page-flush writes or prefetch reads.

Figure 13:
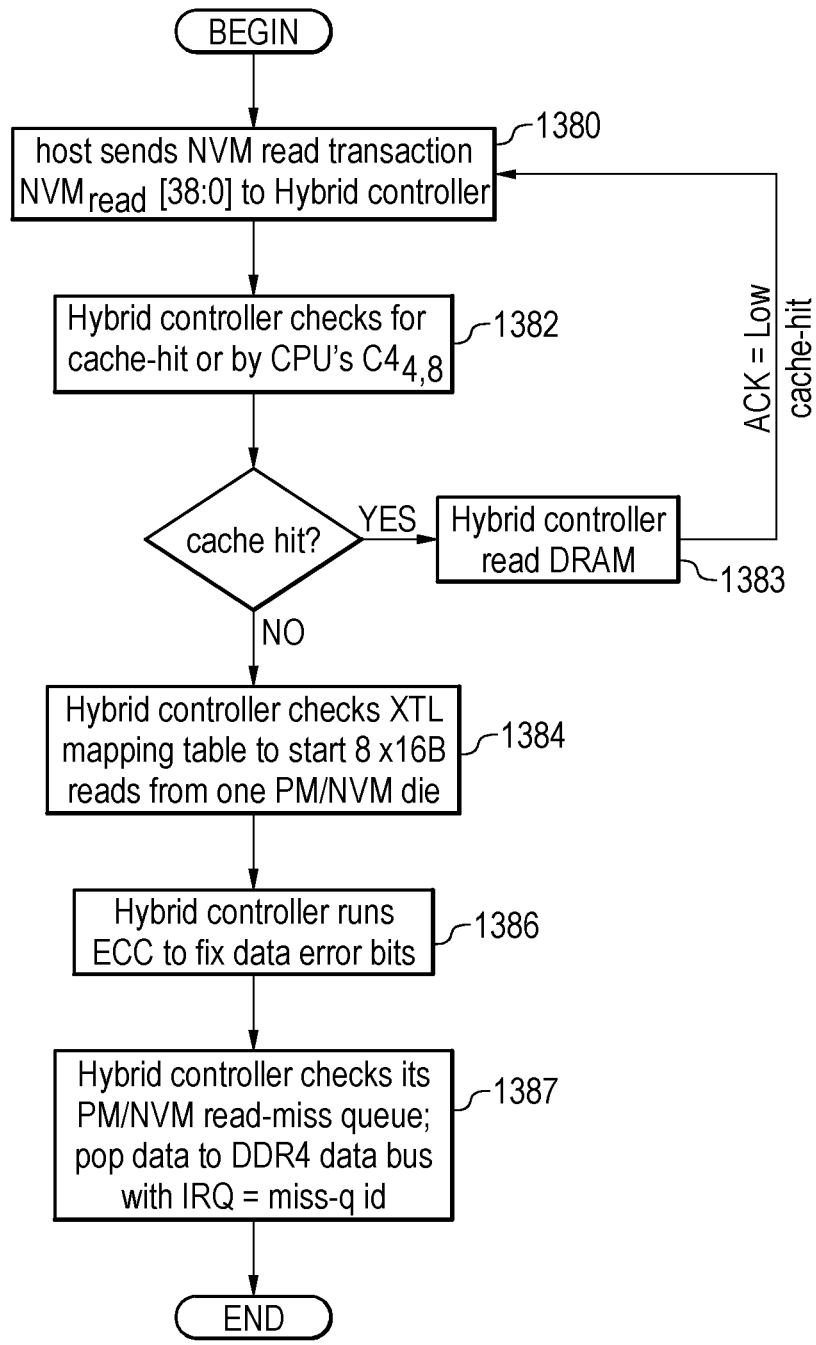
FIG. 13 illustrates a flow chart of read transactions to fetch data bursts from the DRAM cache or PM/NVM/NAND devices, in accordance with various embodiments.

FIG. 13 illustrates a flow chart of NVM read or prefetch operations that the host issues NVM$_{read}$ transaction commands to hybrid controller as task 1380, the hybrid controller checks for cache-hit or informed by host C$_{4,8}$ as 1382, it figured out DRAM address and read from 8 DRAM chips as 1383 and set ACK=Low for 8 clock cycles to inform host cache-hit read translation closed with the 128 B on the DDR4 data bus. The hybrid controller checks the XTL mapping table to read this 8×16B from one PM/NVM die or to pre-fetch 8×16B from 8 PM/NVM with the similar latencies as task 1384. The hybrid controller runs ECC to fix data errors and then updates the cache-miss read transaction queues as task 1387. It could report the number of cache-miss reads data ready in its buffers and the upper 6 bits of queue IDs to the host at odd time-slot$_{1\ or\ 3}$.

Figure 14:
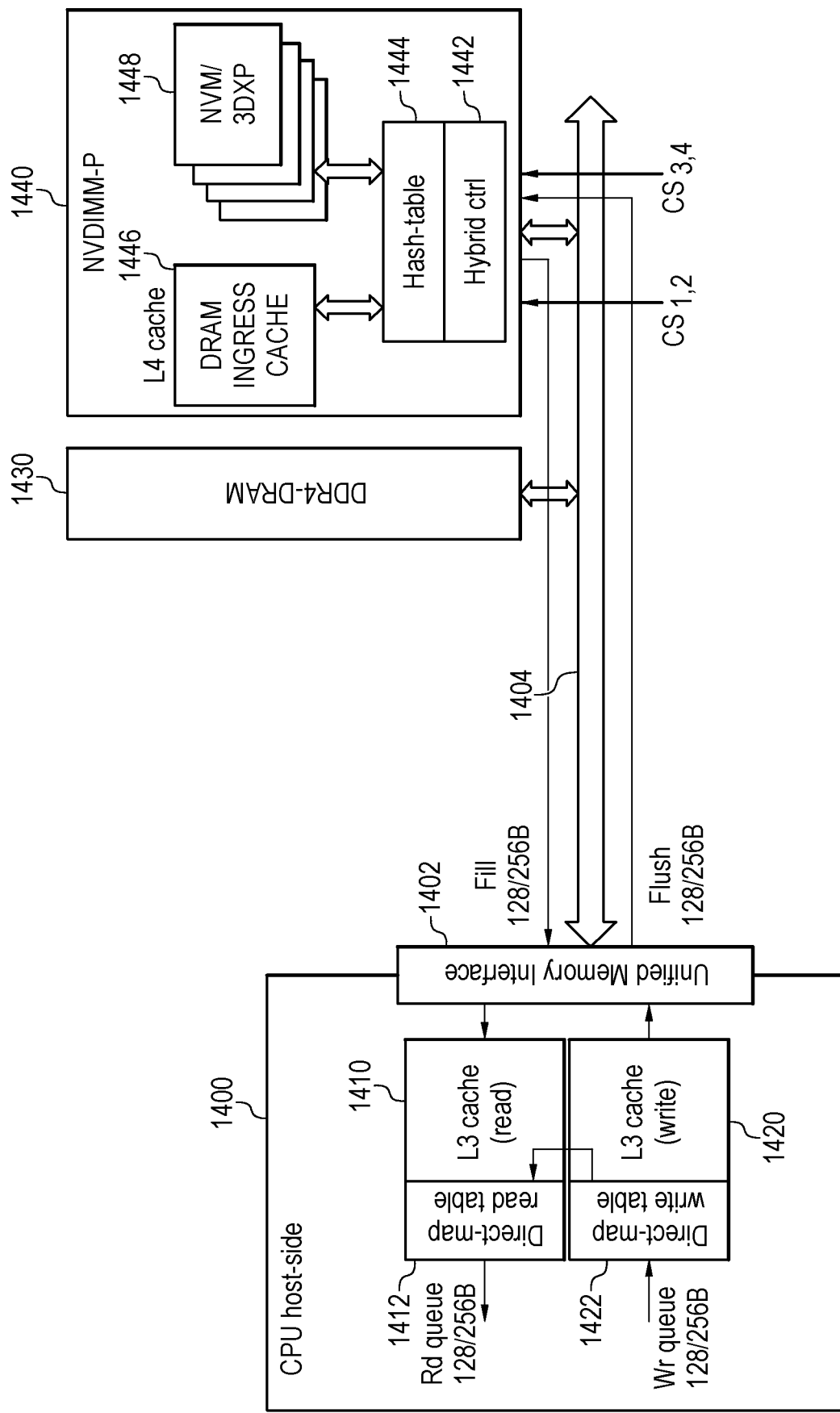
FIG. 14 illustrates a block diagram of host L3 caches and hybrid controller L4 caches mapping managements of volatile and non-volatile memory, in accordance with various embodiments.

FIG. 14 illustrates a block diagram of L4 cache operations to accelerate the PM/NVM memories as 80% or higher chance the applications using the hybrid DRAM space with less than 20% chance using the slower PM/NVM space. The host CPU 1400 has an Unified Memory Interface controller 1402 and L3 read cache 1410 and the direct-mapped read cache tables 1412 and the write cache 1420 and direct-mapped write cache tables 1422, and the DDR4 bus 1404 with CS$_{1,2}$ to access the hybrid DRAM chips 1446 and CS$_3$ to access the hybrid controller 1442 then the PM/NVM chips 1448. The hash-mapped cache tables 1444 may be used to support the 100% write cache-hit rate and less than 20% for prefetch reads and repeating reads localities. The prefetch reads may improve the read cache-hit rate to reach 95% or better in most of big data in-memory computing applications. The hybrid controller 1442 offloads the host cache management operations to let hardware circuits accelerate the cache operations in the background for more than 60% of the time when the host is busy working on DDR4-DRAM DIMM 1430 as previous embodiments described at time-slot$_{1,3,4}$ for hybrid-DIMM$_1$ and at time-slot$_{1,3,2}$ for hybrid-DIMM$_2$.

Figure 15:
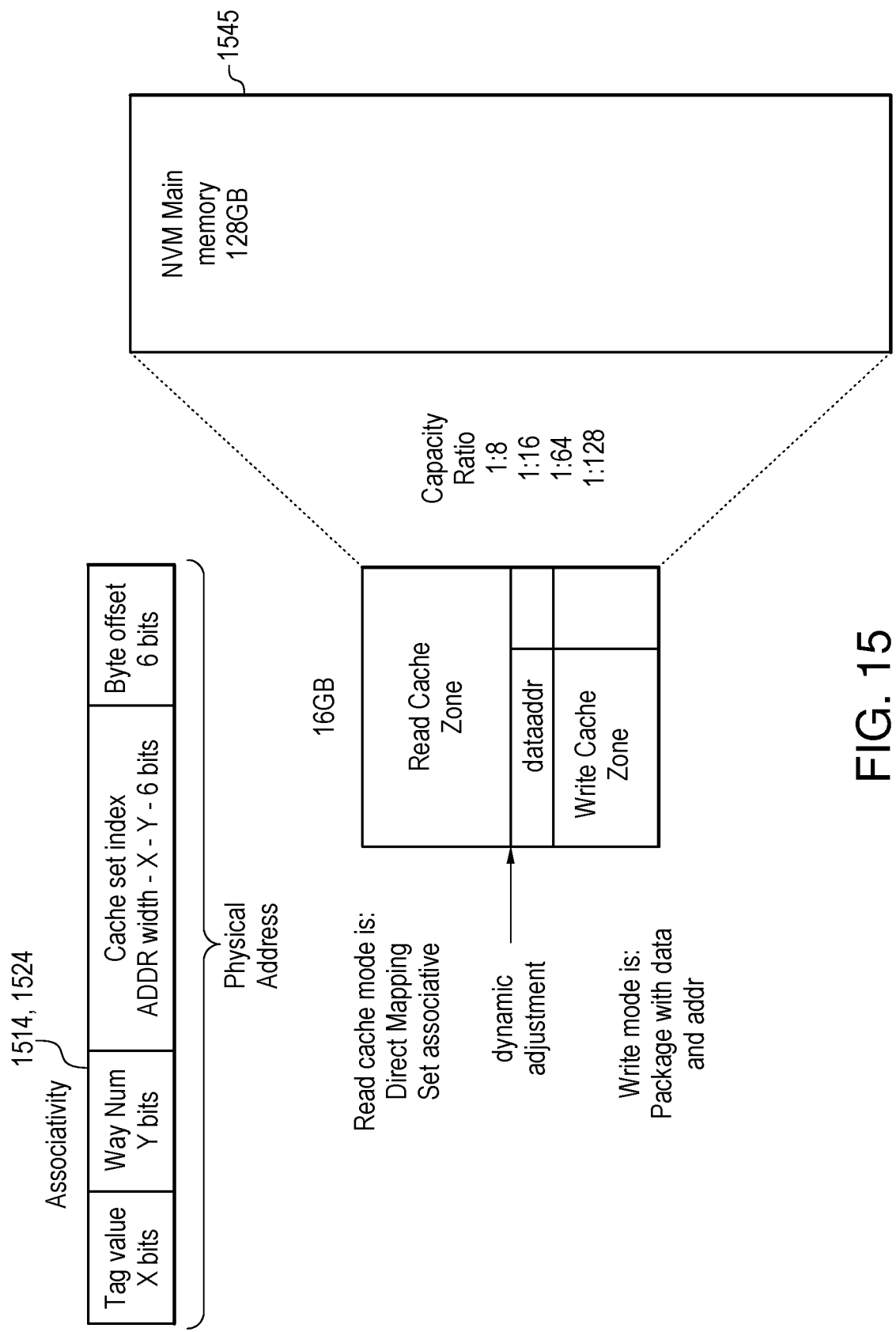
FIG. 15 illustrates the embodiments of direct-mapped cache tables for read cache-lines and for write cache-lines, in accordance with various embodiments.

FIG. 15 illustrates the embodiments of direct-mapped cache tables 1514 for read cache-lines and 1524 for write cache-lines in 128 B or 256 B as BL16 or BL32 accesses to the hybrid-DIMM$_{1\ or\ 2}$. This L3 cache could cover 1 GB cache coherent region within 128 GB PM/NVM chips as 1545, with 2 bits for 4-way associability, 4 bits for tag value, 2 bits for set index, as total 8 bits per 128 B cache-line overhead as 1546; and the L4 cache could use 16 GB DRAM to cover 128 GB PM/NVM capacity as a 1:8 caching ratio. This L4 cache could be handled by the hash-mapped cache tables in the hybrid controller as a 4 KB per cache-page or a 16 KB per super-page, managed by a 32 bit bitmap hit-mask, to cover 32×128 B or a cache-page mixed with 4 bit prefetch-mask to cover 4×1 KB operations. Additionally, a 4 bit cache-set for cache-hit and a cold count (i.e., unused data count) may be used. The hybrid controller may release the cold 16 KB super-pages to the free list as their 128 bit hit-mask are zeros, or flush (e.g., erase) the 128 B cache-lines marked by "1s" in hit-mask to the PM/NVM chips as the cold 16 KB super-pages then release them to the free list when write zone is nearly full or lack free super-pages. The write zone is dynamically adjusted such that there is nearly no victim operations, recycling pre-fetch page. The cold data (i.e., unused data) is flushed/written (not read often) into the PM/NVM thus freeing the PM/NVM for writes when the write zone is nearly full. The write performance is near to DRAMs and read performance is better than directly reading from NVM. The host L3 cache could cover the direct-mapped cache tables to cover few 1 GB PM/NVM space for cache-coherent cache-lines or 128 B burst data among associated CPU cores with less than 2% overhead, the L4 DRAM cache covers entire PM/NVM space for speeding up the slow PM/NVM memories to reach 100% write cache-hit rate and 95% read cache-hit rate with about 0.2% overhead, to form the three tiers of caching managements.

Figure 16:
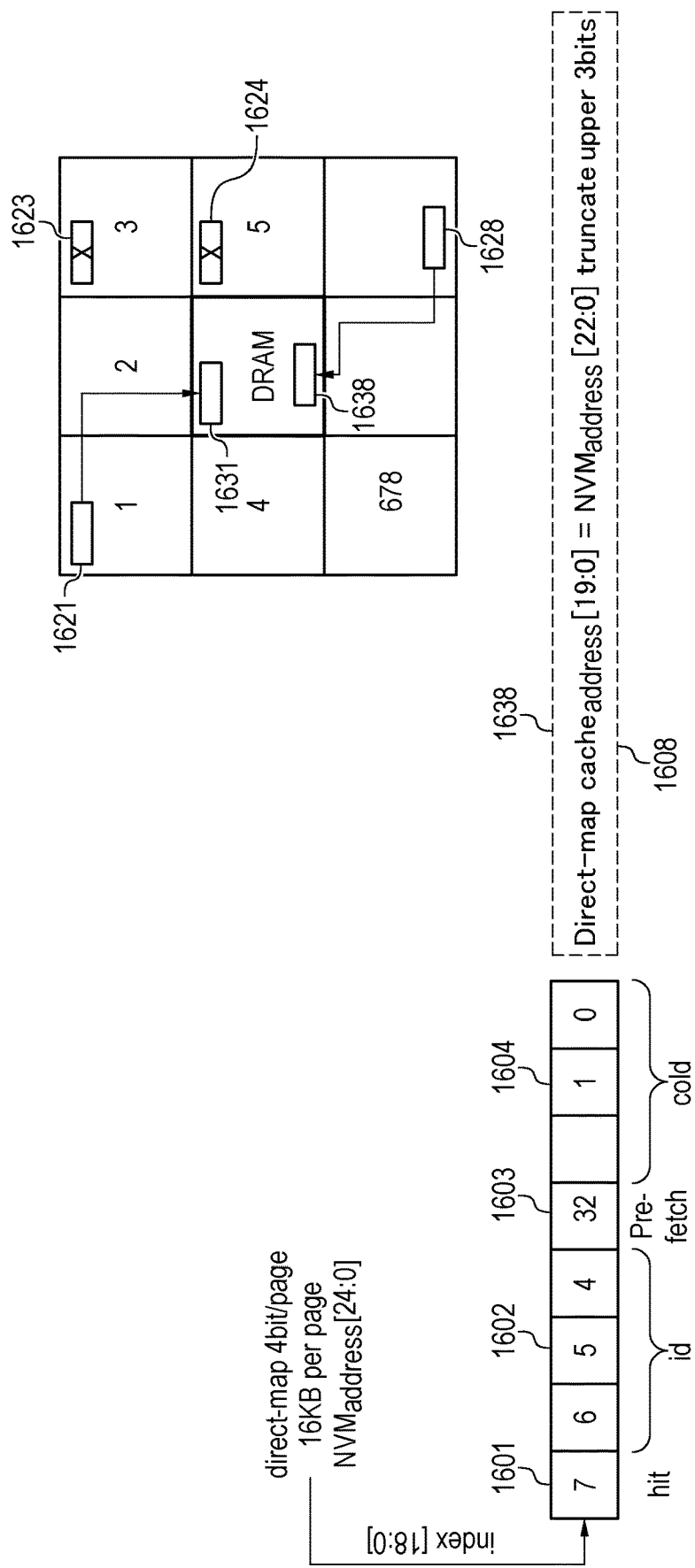
FIG. 16 illustrates how the direct-mapped cache works in a hybrid controller cache table, in accordance with various embodiments.

FIG. 16 illustrates how the direct-mapped cache works in hybrid controller's cache table. There could be 4 bit cache set per 16 KB super-page first bit for free/hit 1601 with 3 bit ID 1602 to the 16 KB and 1 bit prefetch as 1603 and 3 bit cold/traffic count as 1604 plus a 32 bit hit-mask mixed with a 4 bit prefetch mask per 16 KB super-page. The physical address of this 16 KB DRAM location is truncated upper 3 bit from the NVM$_{address}$ by host NVM write/read commands that the first NVM$_{address}$ hits the DRAM cache as 16 KB as 1621 in PM/NVM first 1 GB mapped to the 16 KB in DRAM 1 GB as 1631, then the 16 KB 1623 in the third 1 GB and 1624 in the fifth 1 GB are cache-miss with the same physical page number, where 1621 marked as hit=1, ID=0 then 1623, 1624 and other cache-miss were marked as hit=0, ID=1~7, the 3 bit ID could support the repeatedly writes/reads the same location. Another 16 KB 1628 could hit free DRAM page 1638 by the 32 bit hit-mask mixed with 4 bit prefetch mask in the same 16 KB super-page. The physical page address to the DRAM is truncated upper 3 bit from original NVM$_{address}$ as 1608. The pre-fetch bit 1603 could simplify the release this 16 KB super-page to free space without flush the data to the PM/NVM chips, the 3 bit cold count was increased as the hardware round-robin check through entire cache tables for victims to retire into the free cache space, and reduced by read hit to the super-page, and reset to zero by write hit, in order to find out the not often read cold spots. The 128 GB 3D-XP/NVM memory could be direct-map cached by 16 GB DRAM chips such that 16 GB (cache)=128 GB (3D-XP/NVM)×1/8 (cache ratio)= $NVM_{address}$ [21:0]; truncate upper 3 bits 16 GB $DRAM_{address}$=Bank [2:0], Row [15:0], Col [9:1]; DRAM BL32=128 B.

Figure 17:
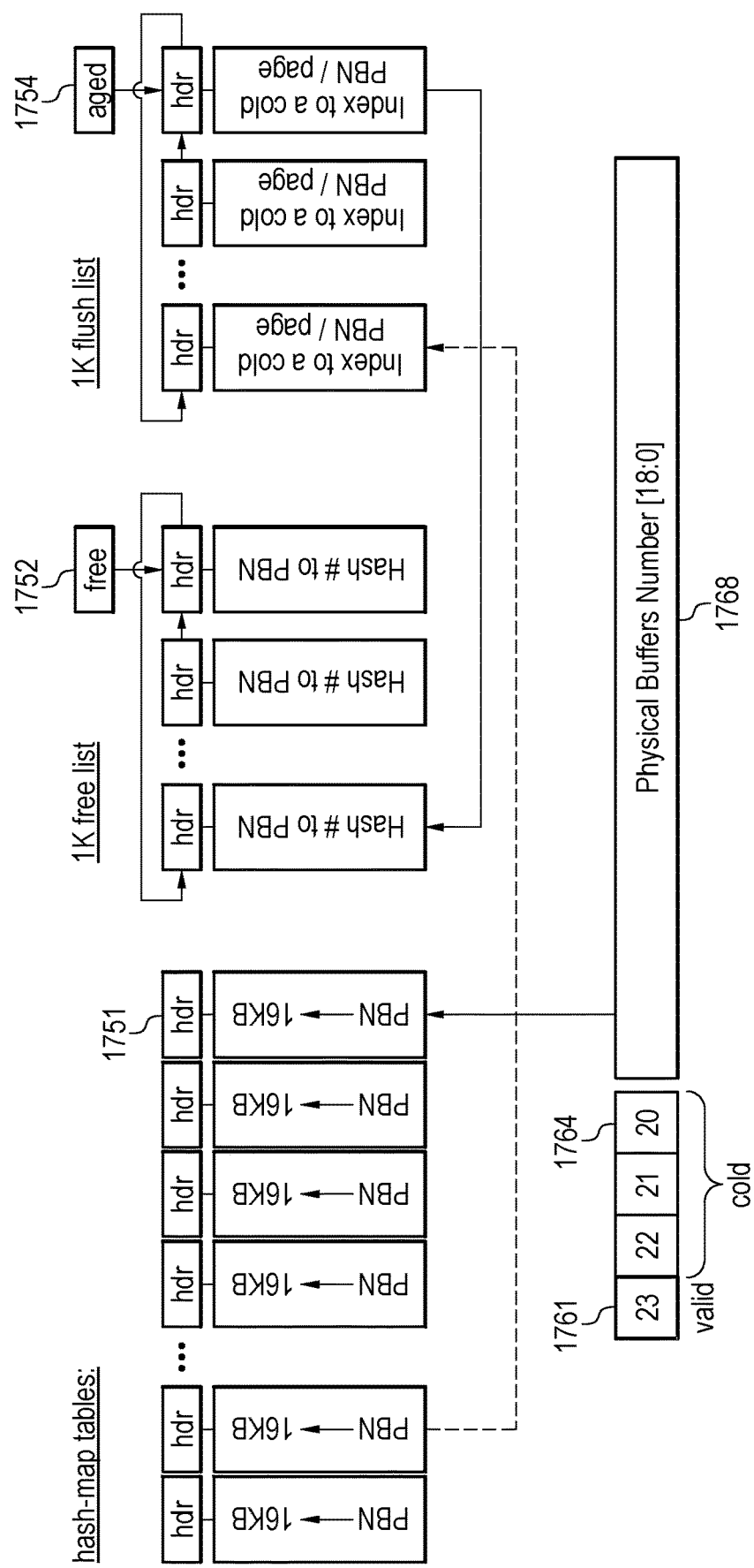
FIG. 17 illustrates the embodiments of a hybrid controller's hash-mapped cache table, in accordance with various embodiments.

FIG. 17 illustrates the embodiments of the hybrid controller's hash-mapped cache table that can be more flexible in DRAM capacity (12 GB then increase dynamically to 16 GB as needed or on-demand) and more effectively use DRAM space with ingress cache for 100% write-cache-hit and pre-fetch ops. The DRAM cache memory space could be organized as 12 GB/16 KB=786,432 super-pages, then each of them has a 4×32 bit hit-mask and a 4×4 bit prefetch mask and a 4 bit set of hit-bit plus 3 bit cold count, marked as 1751, 1761, and 1764. There is a free list of 1K entries as 1752 and each of them saved the physical buffers number, PBN as 1768 with the indexed header 1751 was reset to zeros (4×32 bit hit-mask, 4×4 bit prefetch, hit-bit and 3 bit cold count). There is also a flush list of 1K entries as 1754 waiting for flushing or writing the indexed 16 KB super-pages to the PM/NVM space then to retire/release them into the free list. The 128 GB 3D-XP/NVM memory could be cached by 16 GB DRAM chips as follows: 16 GB (cache)= 128 GB (3D-XP/NVM)×1/8(cache ratio)=1 M (page number)×16 KB (page size).

Figure 18A:
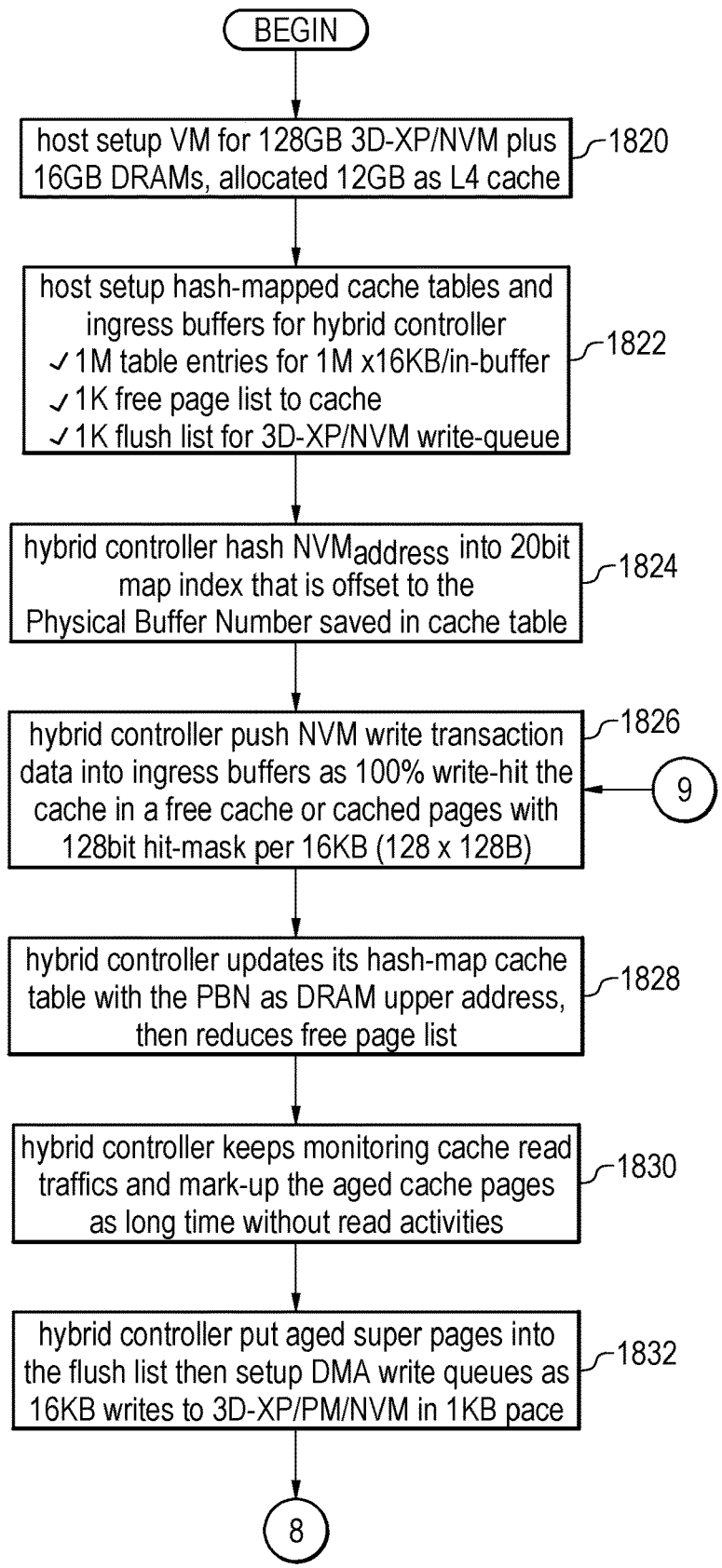
FIGS. 18A, 18B illustrate a flow chart for a hash-mapped cache by a 100% write-hit caching method, in accordance with various embodiments.
Figure 18B:
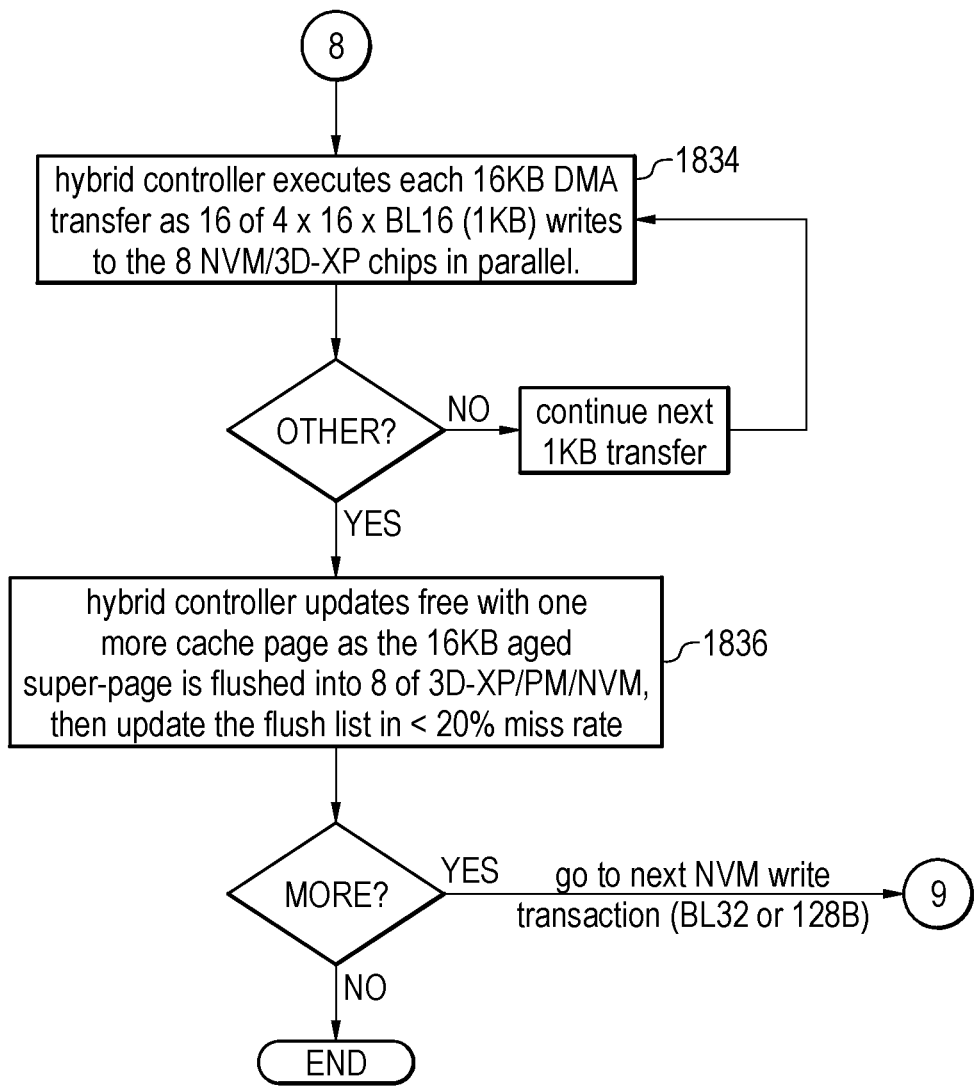

FIGS. 18A, 18B illustrate a flow chart for a hash-mapped cache by a 100% write-hit caching method. The host setup VM space for 128 GB 3D-XP or PM/NVM plus 16 GB DRAMs, and allocated 12 GB as L4 cache that could be dynamically increased as applications demands, in task 1820, host setup hash-mapped L4 cache tables and ingress buffers for hybrid controller to work with 768K entries for 12 GB super-pages or ingress buffers, 1K free page list to cache, and 1K flush list for 3D-XP/PM/NVM write-queues as task 1822. The hybrid controller hash the incoming $NVM_{address}$ into a 20 bit hash index that offset to a physical buffer number PBN saved in the cache tables as task 1824, it push the NVM write transaction data into ingress buffers as 100% write-cache-hit the case if the hash table shown new incoming data as task 1826, it updates the hash table and hit-mask with PBN as 16 KB super-page address plus the hit-mask bit location as lower offset to the 128 B burst, then reduce the free list as task 1828. It could over-writes the cache as hash table and corresponding hit-mask shown hit an old location by skip task 1826 and 1828. The hybrid controller keeps monitoring cache read traffic and mark-up the aged cache pages as long time without read activities by increasing cold count as round-robin checked through this table entry and decreasing the count as reads hit this super-page as task 1830, and it puts the aged super-pages into the flush list then setup DMA write queues as 16 KB writes to 3D-XP/PM/NVM chips in 1 KB write pace as task 1832. The hybrid controller executes each 16 KB DMA transfer as 16 of 8×8×BL16 (1 KB) writes to the 8 of 3D-XP/PM/NVM chips in parallel, and it could continue the 1 KB DMA transfer loop until finished 16 KB writes as task 1834. The hybrid controller updates a free list with one more free super-page cache as this flushing 16 KB aged super-page into 8 of 3D-XP/PM/NVM chips finished as task 1836, it continues the loop to task 1826 if next NVM write transactions are coming.

Figure 19A:
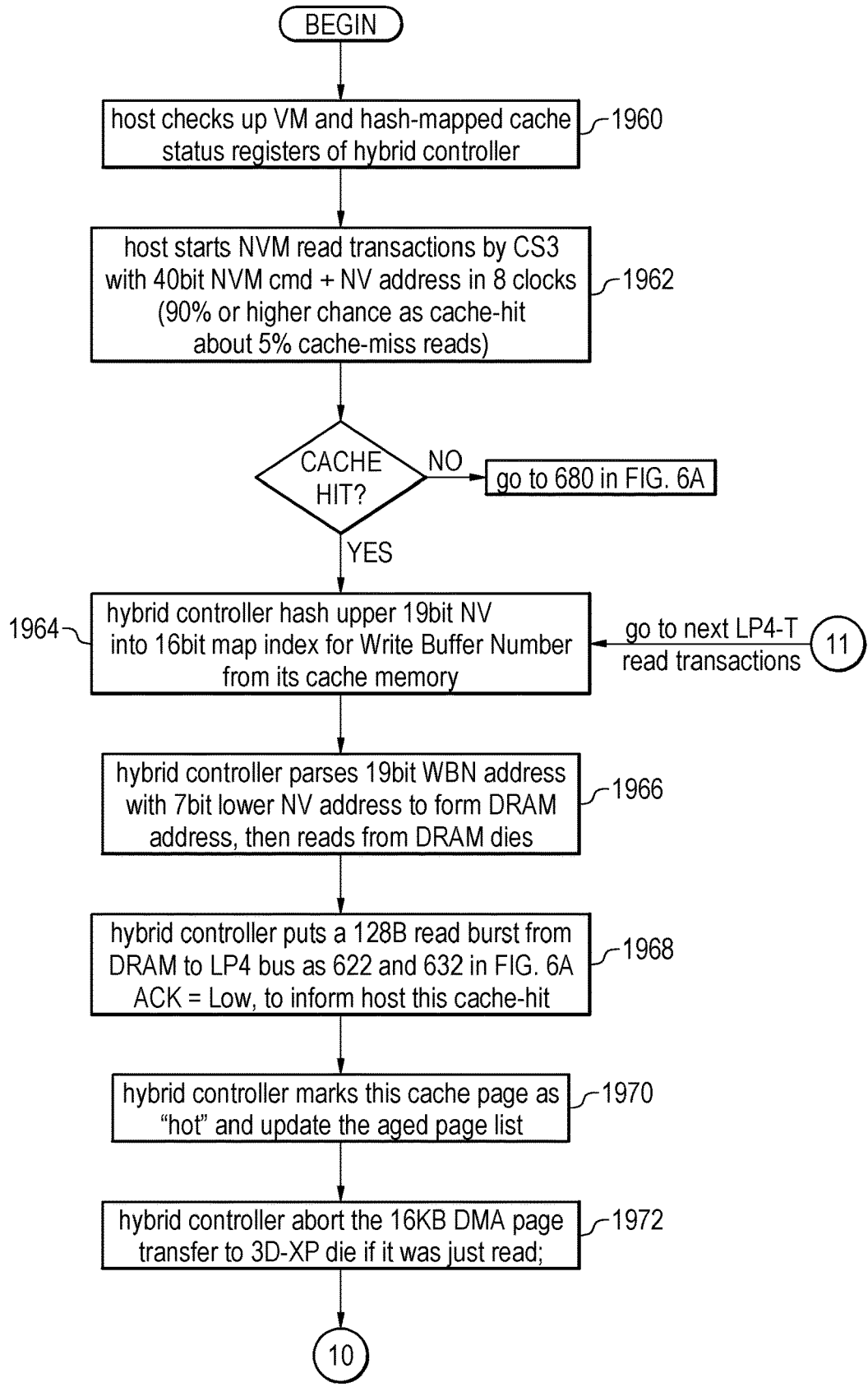
FIGS. 19A, 19B illustrate a flow chart for cache-hit read transactions with L4 cache that illustrates a flow diagram of a read transaction of the transaction-based hybrid memory device, in accordance with various embodiments.
Figure 19B:
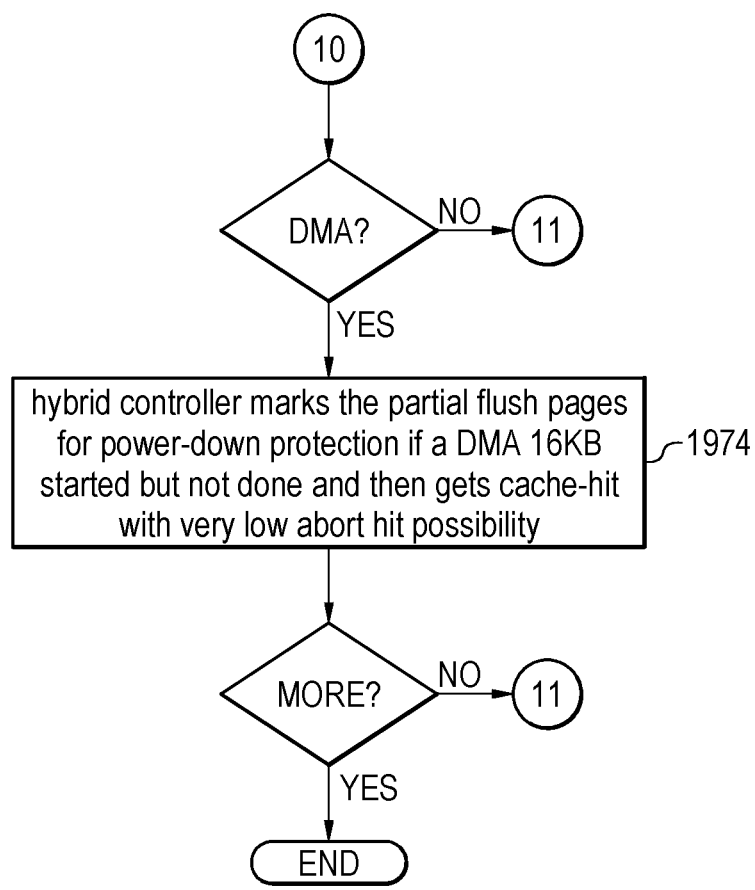

FIGS. 19A, 19B illustrate a flow chart for cache-hit read transactions with L4 cache, in accordance with various embodiments. At task 1960, the host checks up on the VM and hash-mapped cache status registers of the hybrid controller. At task 1962, the host starts the NVM read transactions by CS3 with 40 bit $NVM_{cmd}$+$NVM_{address}$ in 8 clock cycles (e.g., 90% or higher chance as cache-hit and about 5% cache miss reads). If there is a cache-miss, the method jumps to task 1380 to read from PM/NVM chips in FIG. 13.

At task 1964, the hybrid controller hashes the upper 19 bits of NVM address into a 16 bit map index for the Physical Buffer Number (PBN) from its cache memory. At task 1966, the hybrid controller parses 19 bit PBN address with 7 bit lower $NVM_{address}$ to form a DRAM address. The DRAM chips are then read in parallel.

At task 1968, the hybrid controller places a 128 B read burst from DRAM to DDR4 data bus as 1122 and 1132 of FIG. 11. In this case, ACK=Low in 8 clocks to inform the host of the read cache hit.

At task 1970, the hybrid controller marks this cache page as "hot" and updates the aged page list. At task 1972, the hybrid controller aborts the 16 kB DMA page transfer to 3D-XP die if it was just read. If a DMA was just performed, the method repeats from task 1964. If the DMA was not performed, at task 1974 the hybrid controller marks the partial flush pages for power-down protection if a DMA 16 kB was started but not finished and then gets cache-hit with very low abort hit possibility. The process may repeat from task 1964 if additional DMA are necessary.

The above-described caches may use 3 tier caching system where—Tier-one is host CPU's L3 cache and holds a direct-mapped cache table to cover fractional PM/NVM memory space for cache-coherent caching with less than 2% overhead to save Tier-one tables in the host L3 cache. Tier-two includes a hybrid controller's cache memory holding a hash-mapped cache table to cover entire PM/NVM memory space with the Physical Buffer Number for 16 KB super-page and a hit-mask as 4×32 bit bitmap pattern to cover the 128 of 128 B cache-lines to mark which one is empty or has cached data. Tier-three involves a hybrid controller having a prefetch-mask as 4×4 bit bitmap pattern to cover 16 of 1 KB to mark which one having data. The Tier-two cache-hit bitmaps and Tier-three prefetch bitmaps may use less than 0.2% overhead to manage the entire PM/NVM space and provide DRAM performances in more than 90% times and non-deterministic performances at less than 10% cache-miss moments. To minimize the hybrid controller die size, the Tier-two cache hit-mask for majority cold super-pages could be saved in the hybrid DRAM space.

Disclosed implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The previous description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

EXAMPLES

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Example 1 is a transaction-based hybrid memory device comprising: a host memory controller; a hybrid memory controller coupled to the host memory controller over a memory bus, the hybrid memory controller comprising: non-volatile memory control logic; cache control logic comprising a direct memory access (DMA) engine; and a host interface coupled to the host memory controller over the memory bus; a non-volatile memory device coupled to the non-volatile memory control logic; and a volatile memory device coupled to the cache control logic.

In Example 2, the subject matter of Example 1 optionally includes wherein the non-volatile memory device comprises persistent memory, phase change memory, or flash memory.

In Example 3, the subject matter of any one or more of Examples 1-2 optionally includes wherein the volatile memory device comprises dynamic random access memory (DRAM).

In Example 4, the subject matter of any one or more of Examples 1-3 optionally includes wherein the memory bus is a dual data rate fourth generation (DDR4) memory bus and the host memory controller comprises: a DDR4 interface coupled to the DDR4 memory bus; and feedback decoding logic coupled to the hybrid memory controller over an acknowledge/interrupt line.

In Example 5, the subject matter of any one or more of Examples 1-4 optionally includes wherein the host memory controller further comprises: volatile memory command queuing logic, for synchronized memory transactions, coupled to the DDR4 interface; and non-volatile memory command queuing logic, for unsynchronized memory transactions, coupled to the feedback decoding logic and to the volatile memory command queuing logic.

In Example 6, the subject matter of any one or more of Examples 1-5 optionally includes a plurality of DDR4-DRAM devices coupled to the DDR4 memory bus, wherein the host controller is configured to control the plurality of DDR4-DRAM devices with a plurality of chip select signals per DDR4-DRAM device.

In Example 7, the subject matter of any one or more of Examples 1-6 optionally includes wherein the feedback decoding logic is configured to schedule unsynchronized transaction traffic interleaving among DRAM read/write accesses between the host memory controller and the hybrid memory controller.

In Example 8, the subject matter of any one or more of Examples 1-7 optionally includes wherein the host memory controller is configured to control the plurality of DDR4-DRAM devices coupled to the DDR4 memory bus, the non-volatile memory device coupled to the hybrid memory controller, and the DRAM device coupled to the hybrid memory controller.

In Example 9, the subject matter of any one or more of Examples 1-8 optionally includes wherein the host memory controller is further configured to control scheduling of DDR4 bus traffic such that the plurality of DDR4 DRAM devices and the hybrid memory controller each receive different percentages of access to the DDR4 memory bus.

In Example 10, the subject matter of any one or more of Examples 1-9 optionally includes wherein the host interface is coupled to the acknowledge/interrupt line and the hybrid memory controller is configured to communicate a hybrid memory transaction status to the host memory controller in response to an acknowledge signal on the acknowledge/interrupt line or by error messages.

Example 11 is a transaction-based hybrid memory device comprising: a host memory controller comprising: a memory bus interface coupled to a memory bus; feedback decoding logic; volatile memory command queuing logic coupled to the memory bus interface; and non-volatile memory command queuing logic coupled to the feedback decoding logic and to the volatile memory command queuing logic; a volatile memory device coupled to the host memory controller over the memory bus; a hybrid memory controller coupled to the host memory controller over the memory bus, the hybrid memory controller comprising: non-volatile memory control logic; cache control logic comprising a direct memory access (DMA) engine; and a host interface coupled to the host memory controller over the memory bus; a plurality of non-volatile memory devices coupled to the non-volatile memory control logic; and a plurality of volatile memory devices coupled to the cache control logic.

In Example 12, the subject matter of Example 11 optionally includes wherein the cache control logic is coupled to three tiers of cache operations comprising a host direct-mapped cache for cache coherent cache-line accesses to a fraction of memory space, a hybrid memory controller hash-mapped cache with a hit-mask for cache-line accesses, and a hybrid memory controller prefetch-mask for caching operations mixed with the hit-mask.

Example 13 is a method of operation for a transaction-based hybrid memory device, the method comprising: a host memory controller transmitting a transaction read command to a hybrid memory controller; the hybrid memory controller transmitting, in response to the transaction read command, a non-volatile memory read command to a selected one of a plurality of non-volatile memory devices coupled to the hybrid memory controller to read data from the selected one of the plurality of non-volatile memory devices as a prefetch; transferring the read data from the selected one of the plurality of non-volatile memory devices to a selected one of a plurality of volatile memory devices coupled to the hybrid memory controller in response to control signals from a direct memory access (DMA) engine in the hybrid memory controller and without intervention by the host memory controller; and the hybrid memory controller buffering data cache-line and transmitting an acknowledge signal to the host memory controller to indicate that the data is available on the data bus.

In Example 14, the subject matter of Example 13 optionally includes the hybrid memory controller transmitting read command sequences to the selected non-volatile memory devices to cause the selected non-volatile memory devices to perform a burst read operation of the data as a prefetch.

In Example 15, the subject matter of any one or more of Examples 13-14 optionally includes the host memory controller receiving a volatile memory read burst from the hybrid memory controller to deliver the data to the host memory controller in a cache-line read operation with ACK=Low as cache-hit cases, or previous data in the hybrid controller data cache buffers with the data in an interrupt request (IRQ)-pulse-signaling line as cache-miss cases.

In Example 16, the subject matter of any one or more of Examples 13-15 optionally includes the hybrid controller reading prefetch data from non-volatile memory devices; writing the prefetch data to the selected volatile memory devices as bandwidth allowed; updating a prefetch-mask to indicate the writing of the prefetch data; truncating data according to a hit-mask as prefetch writes overlapped with the hit-mask to keep the write hit cache-lines; and updating the hit-mask to cover a partial data write to the volatile memories.

Example 17 is a method of operation for a transaction-based hybrid memory device, the method comprising: a host memory controller transmitting a transaction write command and data to be written to a hybrid memory controller; the host memory controller transmitting a volatile memory address to the hybrid memory controller; the hybrid memory controller transmitting, in response to the transaction write command, a non-volatile memory write command to a selected one of a plurality of volatile memory devices coupled to the hybrid memory controller to write the data to the selected one of the plurality of volatile memory devices based on the volatile memory address; and transferring the written data from the selected one of the plurality of volatile memory devices to a selected one of a plurality of non-volatile memory devices coupled to the hybrid memory controller in response to control signals from a direct memory access (DMA) engine in the hybrid memory controller and without intervention from the host memory controller.

In Example 18, the subject matter of Example 17 optionally includes wherein transmitting the transaction write command and data to be written to the hybrid memory controller comprises the host writing a cache to the hybrid memory controller in a write latency, the method further comprising the hybrid memory controller writing the cache to the selected one of the volatile memory devices and transferring the cache from the selected one of the volatile memory devices to the selected one of the non-volatile memory devices using the write latency.

In Example 19, the subject matter of any one or more of Examples 17-18 optionally include wherein the hybrid memory controller uses a hash-mapped cache to control DMA transfer of unused data.

In Example 20, the subject matter of any one or more of Examples 17-19 optionally include the hybrid memory controller controlling a rate at which the DMA engine transfers the data from the selected volatile memory to the selected non-volatile memory.

The Abstract is provided with the understanding that it will not be used to limit or interpret the scope or meaning of the claims. The following claims are hereby incorporated into the detailed description, with each claim standing on its own as a separate embodiment.

What is claimed is:

1. A method of operation for a transaction-based hybrid memory system, the method comprising:
   receiving at a hybrid memory controller, a transaction read command originating from a command queue of a host memory controller, the command queue comprising at least one mask;
   performing, by the hybrid memory controller, in response to receiving the transaction read command, a non-volatile memory (NVM) read command to read data from a selected NVM device of a plurality of NVM devices coupled to the hybrid memory controller as prefetch data;
   updating, by the hybrid memory controller, the prefetch data according to the at least one mask to obtain updated data;
   transferring, by the hybrid memory controller, the updated data from the selected NVM device to a selected volatile memory (VM) device of a plurality of VM devices coupled to the hybrid memory controller in response to control signals from a direct memory access (DMA) engine in the hybrid memory controller and without intervention by the host memory controller;
   buffering, by the hybrid memory controller, the updated data in a cache-line of a data bus; and
   transmitting, by the hybrid memory controller, an acknowledge signal to the host memory controller to indicate that the data is available on the data bus.

2. The method of claim 1, further comprising:
   the hybrid memory controller transmitting read command sequences to the selected NVM device to cause the selected NVM device to perform a burst read operation of the data as prefetch data.

3. The method of claim 2, further comprising:
   communicating a volatile memory read burst to the host memory controller from the hybrid memory controller, to deliver the updated data to the host memory controller in a cache-line read operation.

4. The method of claim 3, wherein the cache-line read operation comprises:
   an acknowledgment indicator (ACK) of "Low" for cache-hit cases.

5. The method of claim 4, wherein the cache-line read operation comprises:
   previous data in a cache buffer of the hybrid memory controller with the previous data being in an interrupt request (IRQ)-pulse-signaling line for precache-miss cases.

6. The method of claim 3, further comprising:
   the hybrid memory controller reading the prefetch data from the plurality of non-volatile memory devices; and
   the hybrid memory controller writing the prefetch data to the selected VM device.

7. The method of claim 6, wherein the at least one mask comprises a prefetch-mask and a hit-mask, and the method further comprising:
   updating the prefetch-mask to indicate writing of the prefetch data as a prefetch write; and
   updating the data based on truncating the prefetch data according to the hit-mask, when the prefetch write overlaps with the hit-mask.

8. The method of claim 7, further comprising:
updating the hit-mask to cover a partial data write of the prefetch data to the selected VM device.

9. A method of operation for a transaction-based hybrid memory system, the method comprising:
receiving by a hybrid memory controller, a transaction write command and data from a command queue of a host memory controller, the command queue comprising at least one mask;
receiving by the hybrid memory controller, a volatile memory address from the host memory controller;
transmitting by the hybrid memory controller, in response to receiving the transaction write command, a non-volatile memory write command to a selected volatile memory (VM) device of a plurality of VM devices coupled to the hybrid memory controller, to write the data to the selected VM device based on the volatile memory address to obtain written data;
updating, by the hybrid memory controller, the written data according to the at least one mask; and
transferring by the hybrid memory controller, the updated written data from the selected VM device to a selected non-volatile memory (NVM) device of a plurality of NVM devices coupled to the hybrid memory controller in response to control signals from a direct memory access (DMA) engine in the hybrid memory controller and without intervention from the host memory controller, wherein the hybrid memory controller uses a hash-mapped cache to control DMA transfer of unused data from the data to be written to the selected NVM device.

10. The method of claim 9, wherein receiving the transaction write command and the data comprises:
writing a cache in a write latency.

11. The method of claim 10, further comprising:
writing the cache to the selected VM device; and
transferring the cache from the selected VM device to the selected NVM device using the write latency.

12. The method of claim 9, further comprising:
the hybrid memory controller controlling a rate at which the DMA engine transfers the data from the selected VM device to the selected NVM device.

13. A transaction-based hybrid memory system, the system comprising:
a host memory controller with a command queue coupled to a memory bus, the command queue comprising at least one mask;
a dynamic random-access memory (DRAM) dual in-line memory module (DIMM) coupled to the host memory controller via the memory bus; and
a plurality of hybrid memory DIMMs coupled to the host memory controller over the memory bus, each of the plurality of hybrid memory DIMMs including:
a hybrid memory controller comprising:
non-volatile memory control logic;
cache control logic comprising a direct memory access (DMA) engine; and
a host interface coupled to the host memory controller over the memory bus;
a cluster of non-volatile memory (NVM) devices coupled to the non-volatile memory control logic; and
a cluster of volatile memory (VM) devices coupled to the cache control logic,
wherein the hybrid memory controller is further configured to perform a non-volatile memory (NVM) read command to read data from a selected NVM device of a plurality of NVM devices coupled to the hybrid memory controller as prefetch data, update the prefetch data according to the at least one mask to obtain updated data, and transfer the updated data from the selected NVM device to a selected volatile memory (VM) device of a plurality of VM devices coupled to the hybrid memory controller in response to control signals from a direct memory access (DMA) engine in the hybrid memory controller and without intervention by the host memory controller, and buffer a data cache-line of a data bus associated with the memory bus based on the updated data.

14. The transaction-based hybrid memory system of claim 13, wherein the hybrid memory controller is further configured to:
transmit an acknowledge signal to the host memory controller to indicate that the updated data is available on the data bus.

15. The transaction-based hybrid memory system of claim 13, wherein the hybrid memory controller is further configured to:
transmit read command sequences to the selected NVM device to cause the selected NVM device to perform a burst read operation of the data as the prefetch data.

16. The transaction-based hybrid memory system of claim 15, wherein the hybrid memory controller is further configured to:
communicate a volatile memory read burst to the host memory controller, the volatile memory read burst to deliver the updated data to the host memory controller in a cache-line read operation.

17. The transaction-based hybrid memory system of claim 16, wherein the cache-line read operation comprises an acknowledgment indicator (ACK) of "Low" for cache-hit cases, and wherein the cache-line read operation comprises previous data in a cache buffer of the hybrid memory controller with the previous data being in an interrupt request (IRQ)-pulse-signaling line for precache-miss cases.

18. The transaction-based hybrid memory system of claim 16, wherein the at least one mask comprises a prefetch-mask and a hit-mask, and wherein the hybrid memory controller is further configured to:
read the prefetch data from the cluster of non-volatile memory devices;
write the prefetch data to the selected one of the cluster of volatile memory devices;
update the prefetch-mask to indicate writing of the prefetch data as a prefetch write; and
update the data at least by truncating the prefetch data according to the hit-mask, when the prefetch write overlaps with the hit-mask.

* * * * *